(12) United States Patent
Jackson

(10) Patent No.: US 7,294,257 B2
(45) Date of Patent: Nov. 13, 2007

(54) WATER FILTER

(75) Inventor: Nicholas Jackson, Southport (GB)

(73) Assignee: Filmlight Limited (GB)

( * ) Notice: Subject to any disclaimer, the term of this patent is extended or adjusted under 35 U.S.C. 154(b) by 57 days.

(21) Appl. No.: 10/466,533

(22) PCT Filed: Dec. 14, 2001

(86) PCT No.: PCT/GB01/05533

§ 371 (c)(1),
(2), (4) Date: Dec. 18, 2003

(87) PCT Pub. No.: WO02/056995

PCT Pub. Date: Jul. 25, 2002

(65) Prior Publication Data
US 2004/0094470 A1 May 20, 2004

(30) Foreign Application Priority Data

| Jan. 18, 2001 | (GB) | ................................. 0101489.3 |
| Jun. 29, 2001 | (GB) | ................................. 0116008.4 |
| Nov. 20, 2001 | (GB) | ................................. 0127816.7 |

(51) Int. Cl.
*B01D 29/11* (2006.01)
*B01D 29/68* (2006.01)
*A01K 63/04* (2006.01)

(52) U.S. Cl. .................. 210/167.21; 210/170.02; 210/409; 210/412; 210/413; 210/416.1; 210/416.2; 119/259

(58) Field of Classification Search ................ 210/407, 210/409, 410–413, 416.1, 416.2, 167.21, 210/170.02; 119/259, 260
See application file for complete search history.

(56) References Cited

U.S. PATENT DOCUMENTS 2,772,233 A * 11/1956 Nelson ........................ 210/608

(Continued)

FOREIGN PATENT DOCUMENTS

DE       1247272       8/1967

(Continued)

OTHER PUBLICATIONS

UK Search Report for Application No. GB 0127816.7 dated Jan. 28, 2003.

(Continued)

*Primary Examiner*—Fred G. Prince
(74) *Attorney, Agent, or Firm*—Jackson Walker LLP; Robert C. Klinger

(57) ABSTRACT

A filter unit for filtering particulates and other foreign matter from a water supply, comprising a filtering chamber. At least a portion of an exterior of the filtering chamber being provided with filtering chamber in use. The mesh being sized to filter particulates and other foreign matter from the water. The filter unit further comprising an outlet through which filtered water exits the filter unit, and a rotatable member located within the filtering chamber, the rotatable member having at least one outlet spaced from an internal face of a mesh. The axis of rotation of the rotatable member being such that the at least one outlet traverses at least a substantial portion of the internal face of a mesh. The filter unit further comprising a dedicated pump having an inlet communicating with the filtering chamber and an outlet communicating solely with the rotatable member such that operation of the pump causes filtered water from within the filtering chamber to be pumped through the rotatable member to exit the at least one outlet and impinge on the internal face of the mesh so as to cause particulates and other foreign matter located on an external face of the mesh to be dislodged.

57 Claims, 25 Drawing Sheets

U.S. PATENT DOCUMENTS

| | | | |
|---|---|---|---|
| 2,796,146 A | | 6/1957 | Hersey, Jr. et al. |
| 3,221,886 A | | 12/1965 | Lamort |
| 3,574,509 A | | 4/1971 | Zentis et al. |
| 3,744,633 A | | 6/1973 | Schmidt, Jr. et al. |
| 3,969,248 A | | 7/1976 | Whitmer |
| 4,025,431 A | | 5/1977 | Saxton |
| 4,042,504 A | | 8/1977 | Drori |
| 4,060,483 A | | 11/1977 | Barzuza |
| 4,085,051 A | | 4/1978 | Kaminsky et al. |
| 4,230,576 A | | 10/1980 | Muller et al. |
| 4,282,105 A | | 8/1981 | Crowe |
| 4,297,209 A | * | 10/1981 | DeVisser et al. ............ 210/107 |
| 4,308,142 A | | 12/1981 | Braukmann et al. |
| 4,312,752 A | | 1/1982 | Malik |
| 4,404,106 A | | 9/1983 | Muller et al. |
| 4,412,920 A | * | 11/1983 | Bolton et al. ............... 210/409 |
| 4,710,296 A | * | 12/1987 | Connolly .................... 210/420 |
| 4,867,870 A | | 9/1989 | Kettlety et al. |
| 4,906,357 A | * | 3/1990 | Drori ......................... 210/143 |
| 4,923,600 A | | 5/1990 | Krofta |
| 4,975,189 A | | 12/1990 | Liszka |
| 5,074,999 A | | 12/1991 | Drori |
| 5,152,891 A | | 10/1992 | Netkowicz et al. |
| 5,164,079 A | | 11/1992 | Klein |
| 5,192,429 A | | 3/1993 | Bader |
| 5,228,993 A | | 7/1993 | Dori |
| 5,246,580 A | | 9/1993 | Stedfeldt |
| 5,290,434 A | * | 3/1994 | Richard ...................... 210/109 |
| 5,290,437 A | | 3/1994 | Lin |
| 5,297,513 A | * | 3/1994 | Musgrave ................... 119/252 |
| 5,490,924 A | | 2/1996 | Macia et al. |
| 5,545,321 A | | 8/1996 | Drori |
| 5,589,080 A | | 12/1996 | Cho et al. |
| 5,595,655 A | * | 1/1997 | Steiner et al. ............... 210/391 |
| 5,598,889 A | | 2/1997 | Jackson |
| 5,667,683 A | * | 9/1997 | Benian ....................... 210/409 |
| 5,714,065 A | | 2/1998 | Huder |
| 5,733,464 A | | 3/1998 | Bunch |
| 6,077,422 A | | 6/2000 | Ryles |
| 6,231,764 B1 | | 5/2001 | Wilkins |
| 6,267,879 B1 | | 7/2001 | Gil |
| 2002/0008068 A1 | | 1/2002 | Anderson |

FOREIGN PATENT DOCUMENTS

| | | |
|---|---|---|
| DE | 3611075 | 4/1986 |
| DE | 20000897 | 1/2000 |
| EP | 0429409 | 5/1991 |
| EP | 0623372 | 11/1994 |
| EP | 0460842 | 3/1998 |
| EP | 0925817 | 10/1998 |
| FR | 1036017 | 9/1953 |
| FR | 7236188 | 10/1972 |
| FR | 2163433 | 5/1976 |
| FR | 2677265 | 6/1991 |
| GB | 1146590 | 5/1965 |
| GB | 1341138 | 12/1973 |
| GB | 1485989 | 9/1977 |
| GB | 1490832 | 11/1977 |
| GB | 2157964 | 11/1985 |
| GB | 2159725 | 12/1985 |
| GB | 2185418 | 7/1987 |
| GB | 2188250 | 9/1987 |
| GB | 2196269 | 4/1988 |
| GB | 2293333 | 3/1996 |
| GB | 302290 | 1/1997 |
| WO | WO96/36416 | 11/1996 |
| WO | WO 00/61258 | 10/2000 |

OTHER PUBLICATIONS

UK Search Report for Application No. GB 0101489.3 dated Aug. 23, 2001.

UK Combined Search and Examination Report for Application No. GB 0116008.4 dated Nov. 20, 2001.

* cited by examiner

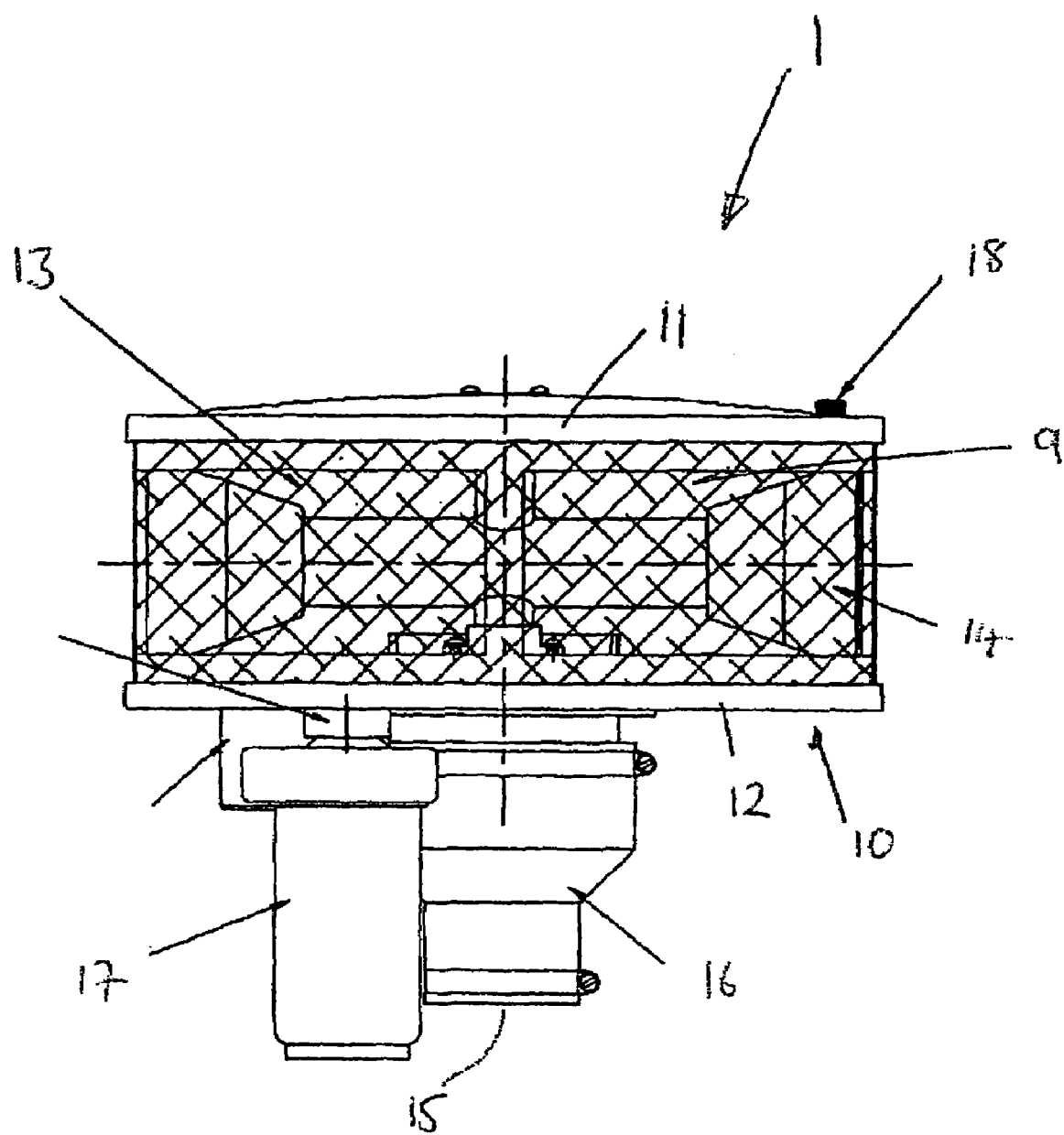

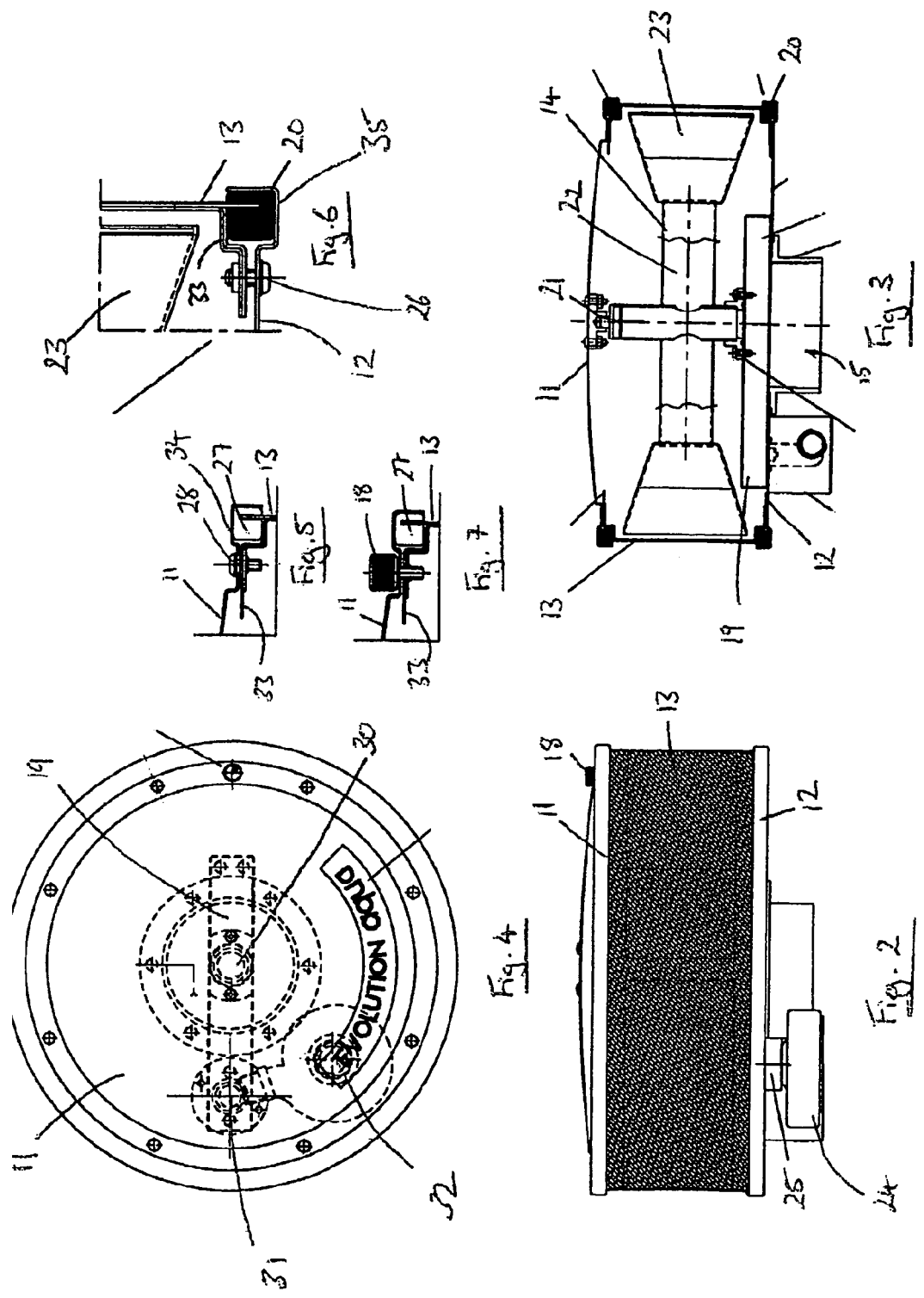

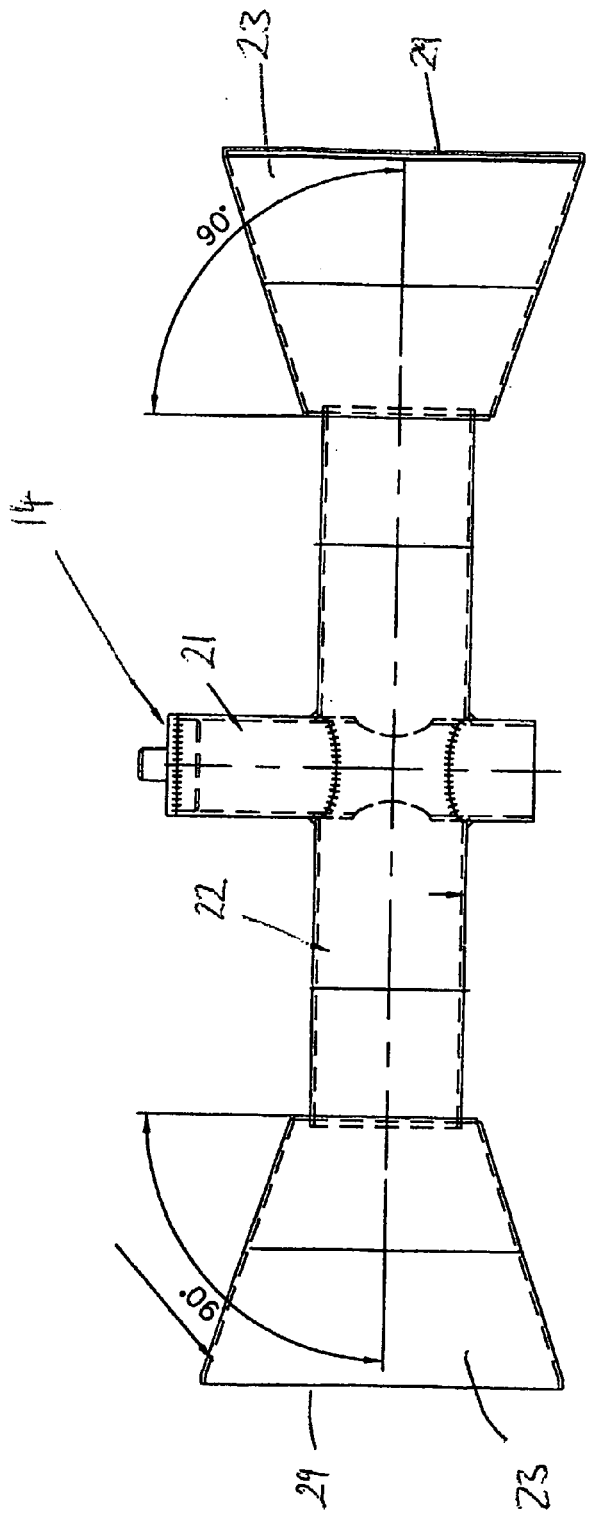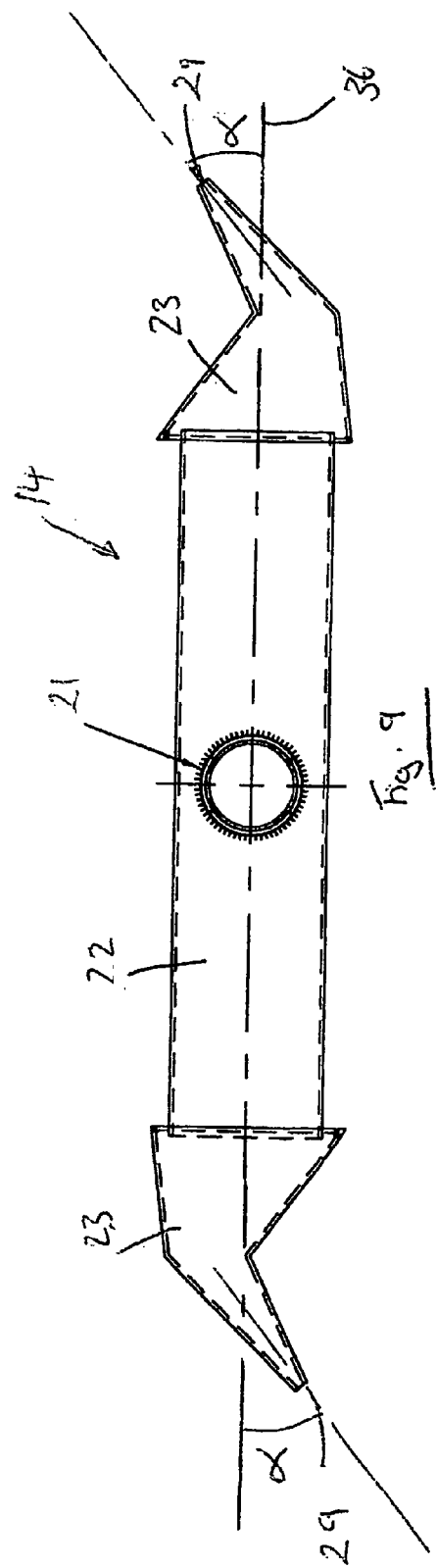

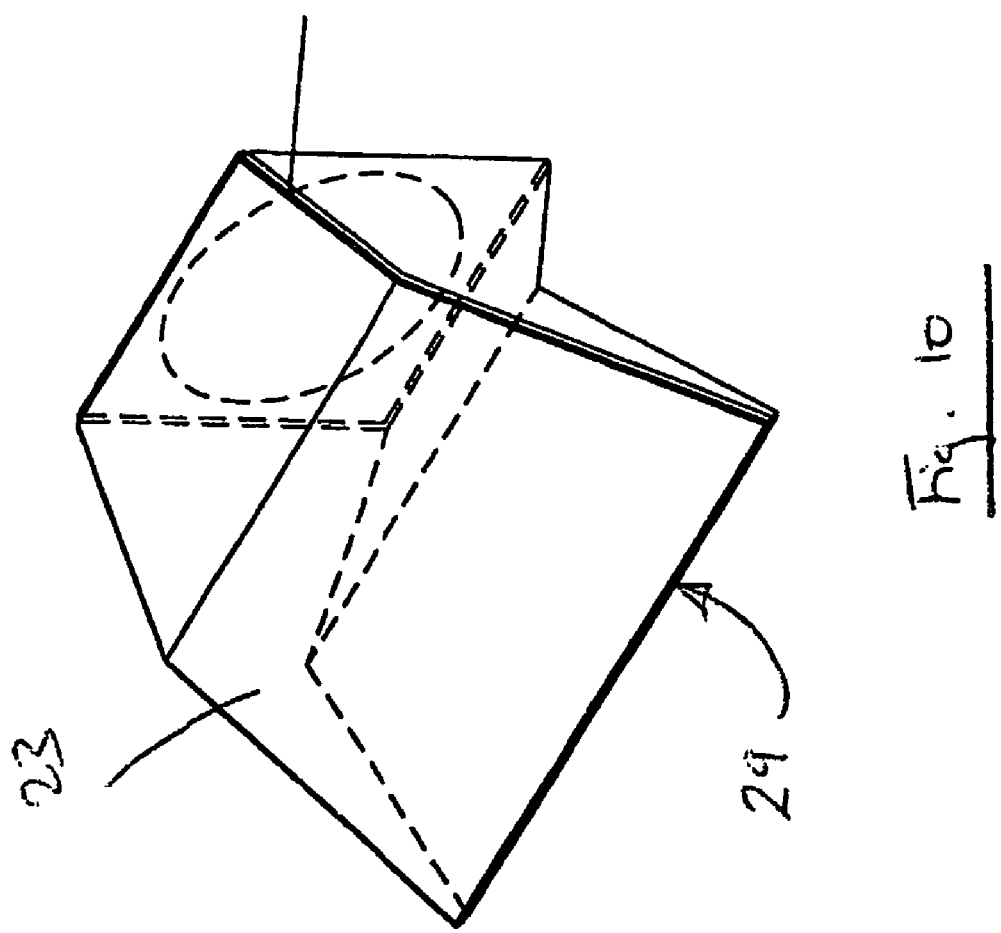

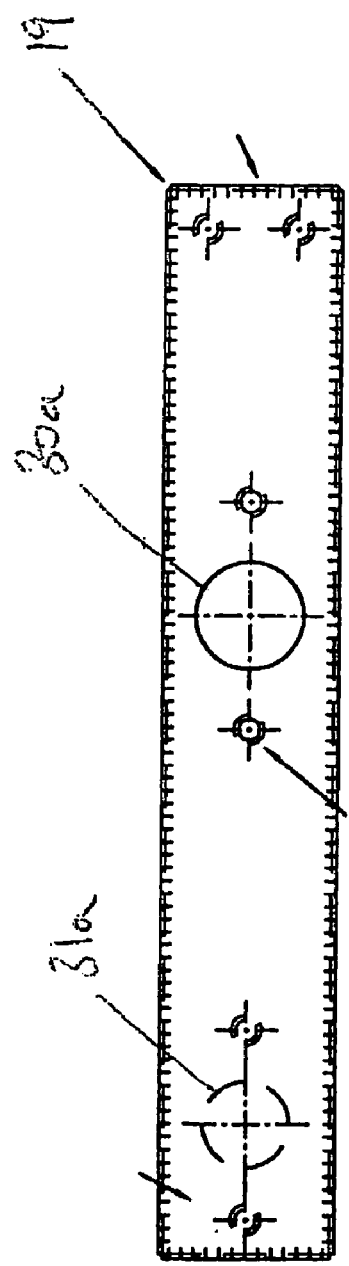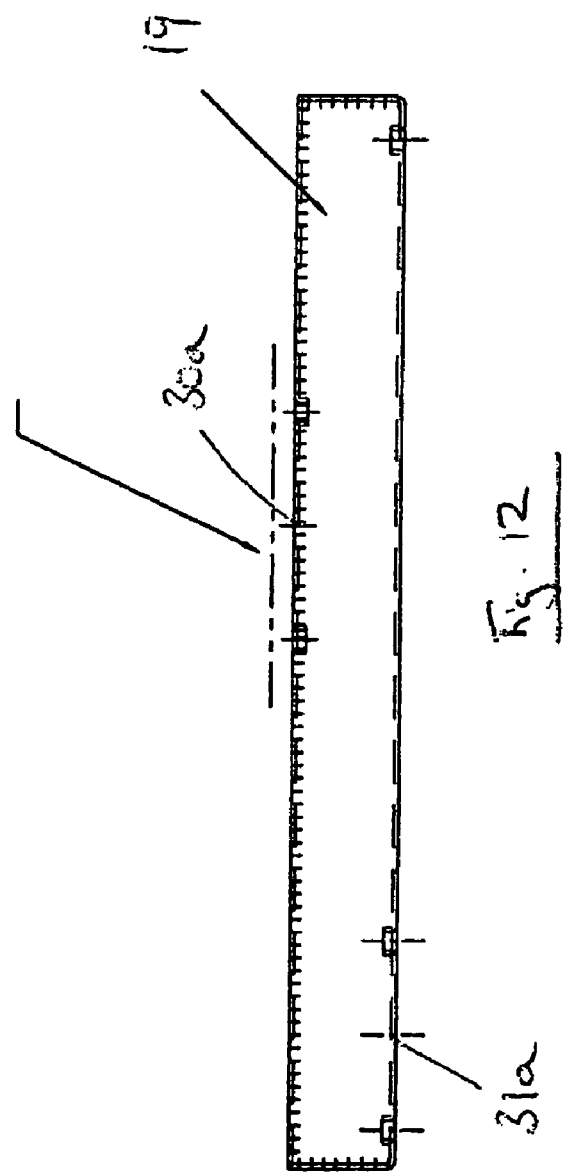

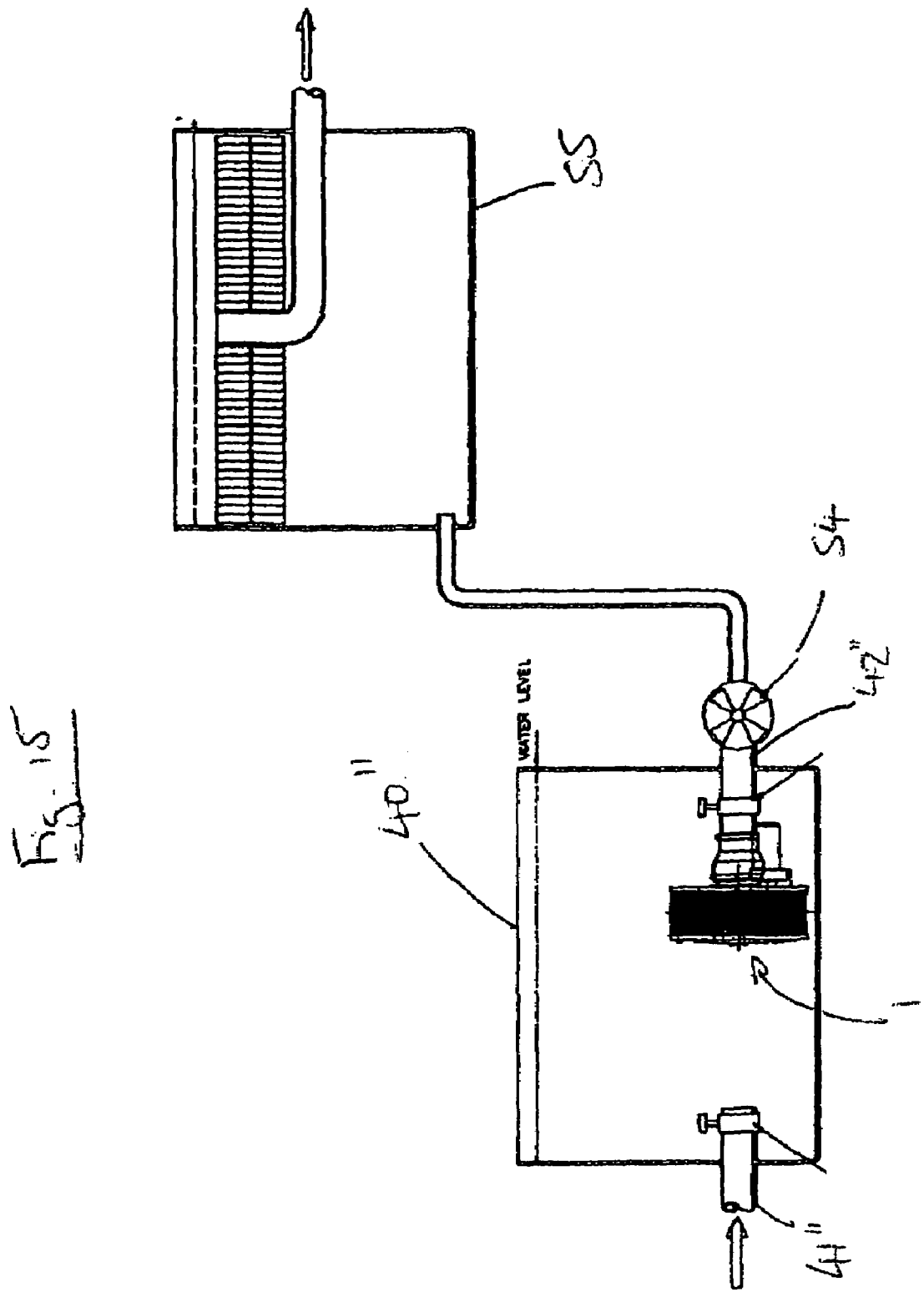

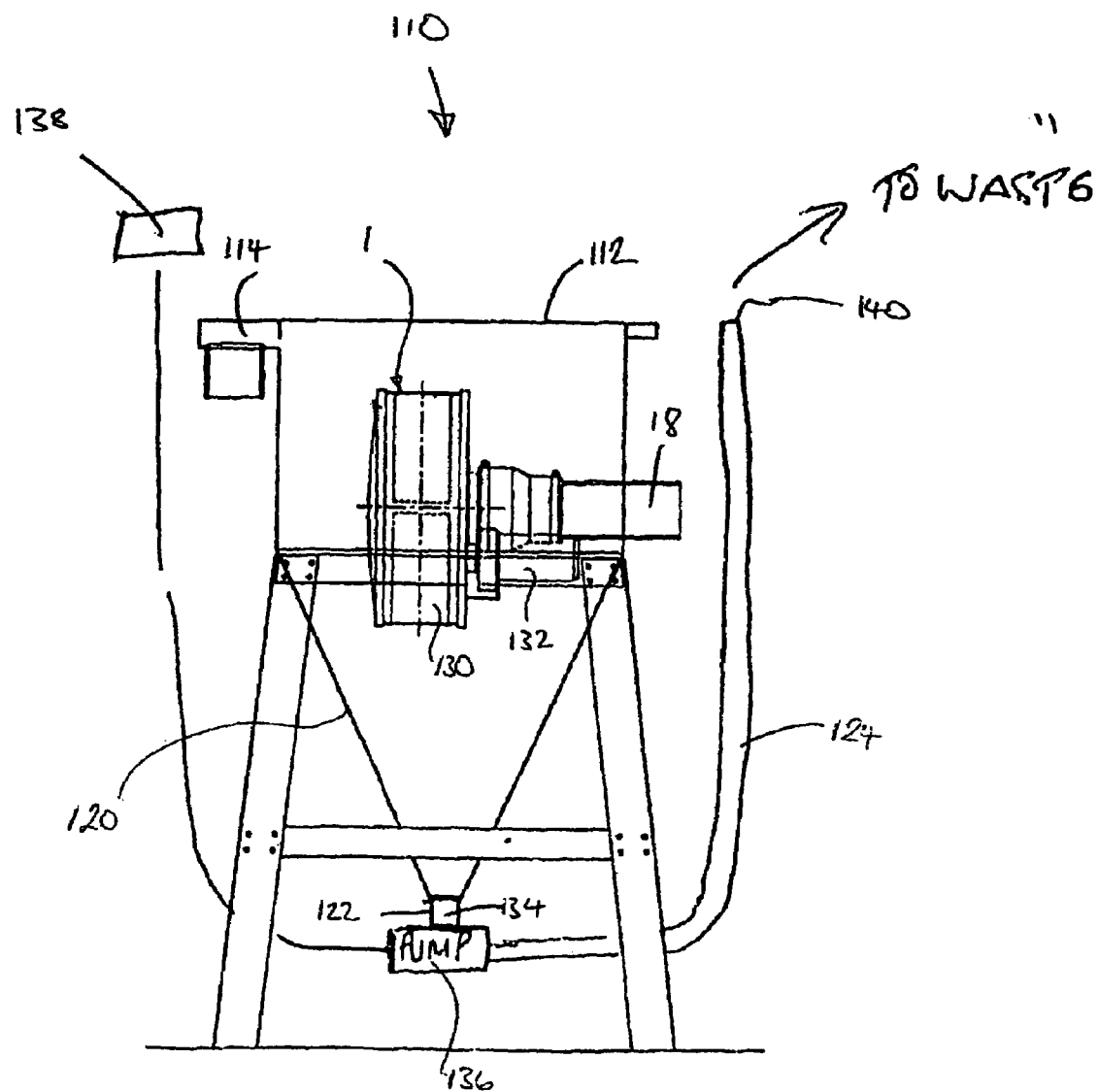

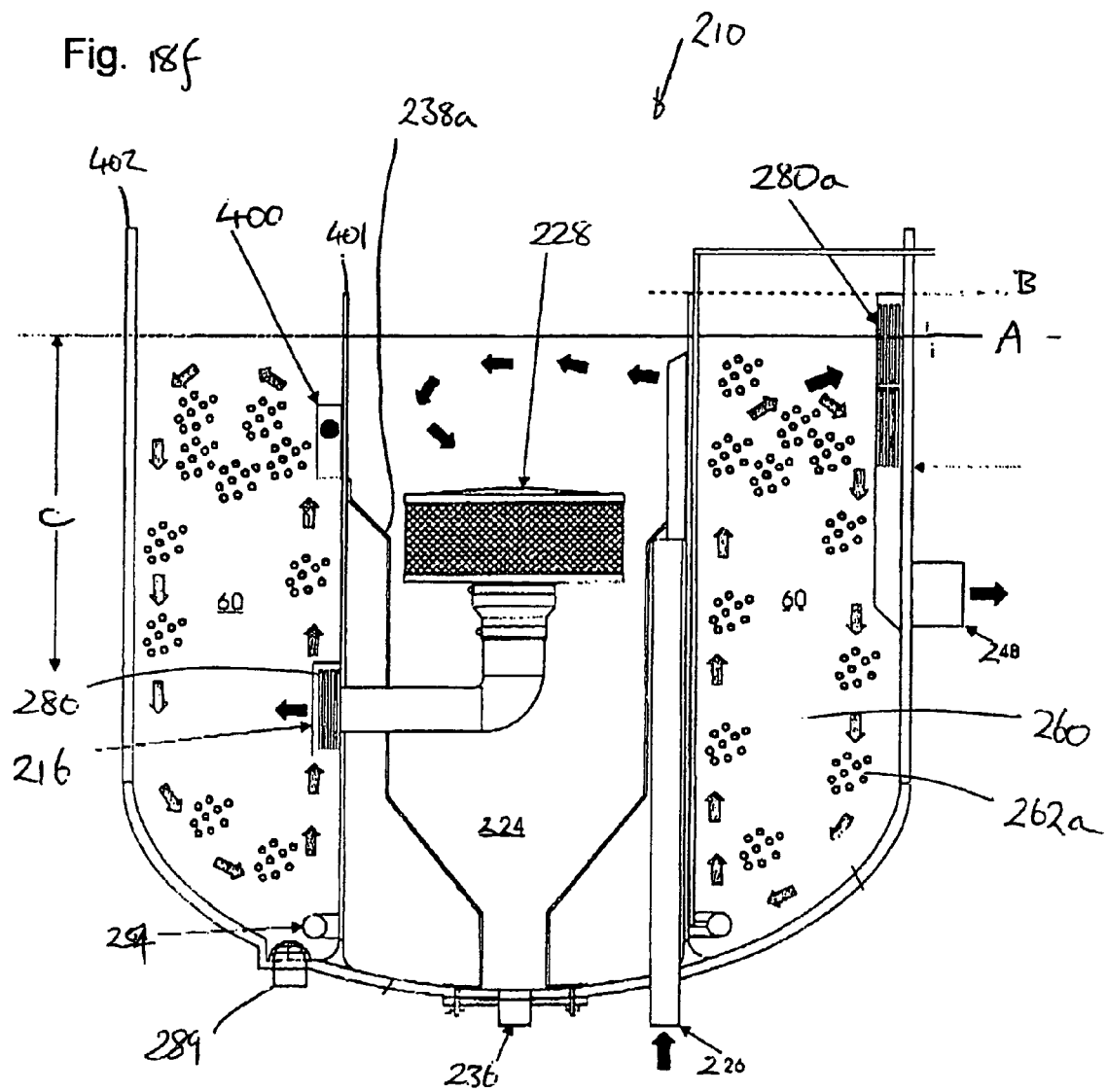

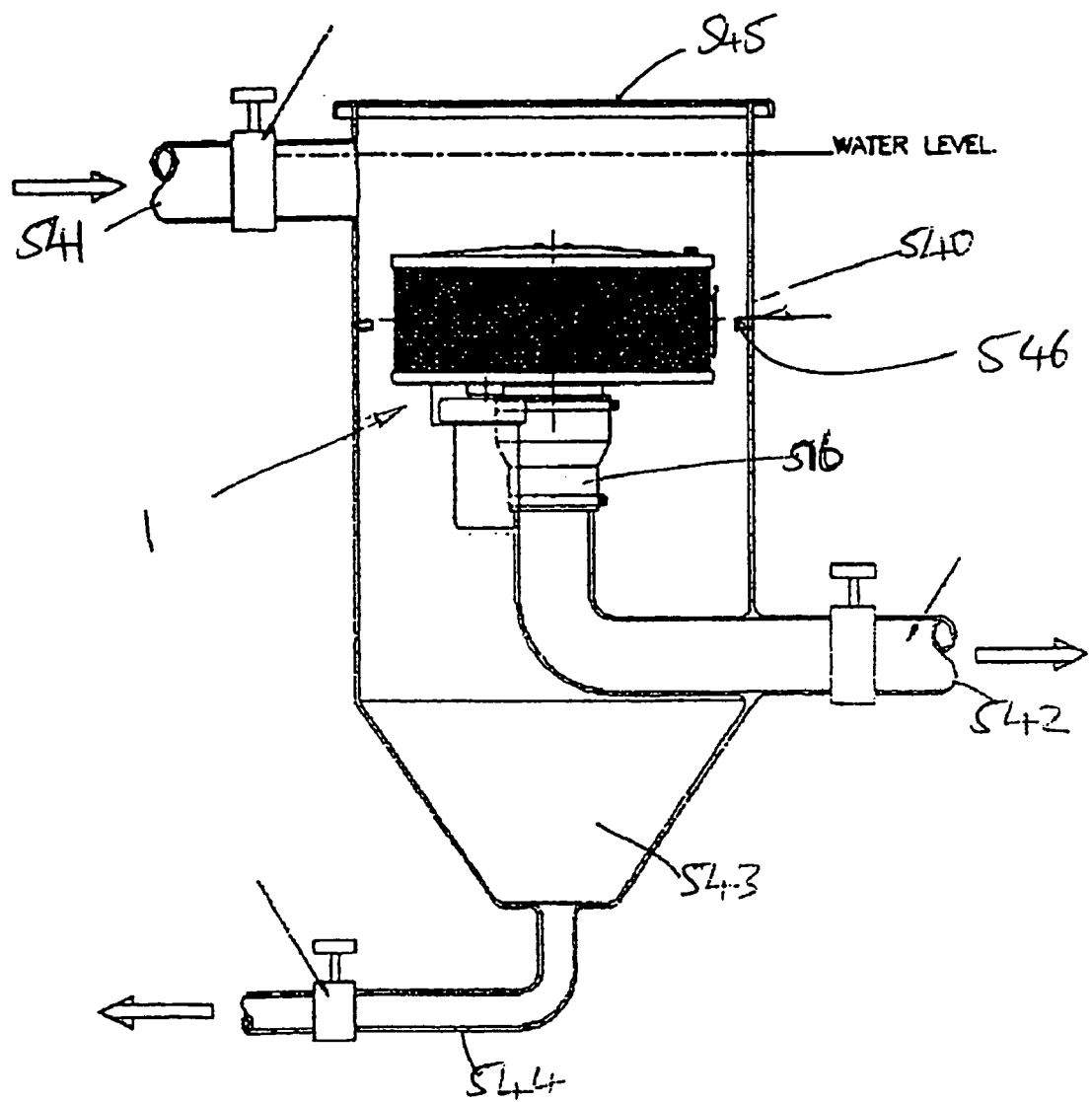

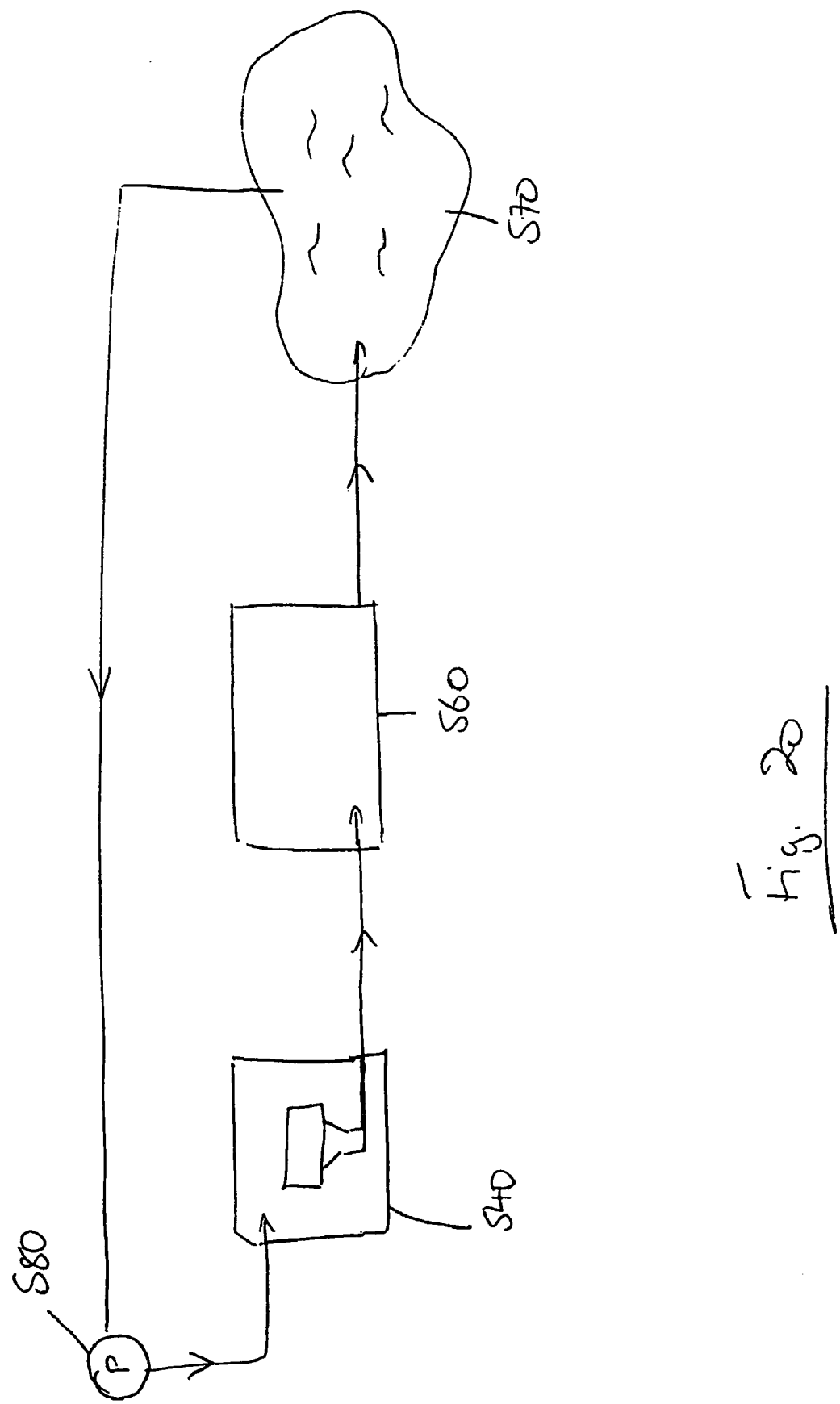

WATER FILTER

The present invention relates to a filter unit for filtering particulates and other foreign matter from a water supply. In addition, the invention relates to filter unit assemblies and filtration systems and methods of filtration using the filter unit.

It is known to provide filter units and filtration systems in water supplies in order to remove particulate matter and other foreign matter from the water supply. One example of the use of such a filter unit and filtration system is in filtering the water supply for a fish pond or aquarium.

It is known to filter a water supply by passing the water supply through a small aperture mesh to thereby remove particles and foreign matter having a diameter greater than the aperture size of the mesh. However, a problem with such a system is that the mesh quickly becomes blocked with the particles and foreign matter removed from the water supply at which point the filtration system ceases to function and the water supply is substantially cut-off. It is therefore necessary to regularly clean the meshes of such filtration systems. This process normally involves dismantling the filtration system which is both time-consuming and complicated. In addition, during maintenance of the system, the water supply must be cut off.

GB 2 293 333 proposes one solution to such a problem wherein a filtering chamber is provided surrounded by a small aperture mesh. Water is drawn through the unit and through the mesh and out of an outlet pipe by means of a pump. A tapping of filtered water from the pumped outlet of the filter chamber is then diverted via a return conduit into a back washing nozzle assembly in the form of a rotatable impeller. The water is spread from outlets of the impeller against the interior face of the mesh in the hope of dislodging particles and debris on the exterior face of the mesh. However, the device of GB 2 293 333 suffers from a number of drawbacks. Firstly, the filter is only usable with an actively pumped filtration system. In other words, the filter unit cannot be used with a gravity-fed system which is commonly found in larger aquaria and fish ponds. Secondly, in order to produce a sufficient dislodging force of the water from the impeller, it has been found necessary to divert a very significant proportion of the filtered water from the outlet back into the rotatable impeller. Potentially up to 90% of the water pumped through the filter unit must be diverted back to the rotatable impeller. Even then, the minimum pore size of the mesh which may be used with such a filter is restricted to greater than about 250 microns otherwise the pressure drop across the filter unit becomes too great and the volumetric throughput of the filter unit becomes too low.

The present invention aims to provide a filter unit which overcomes the disadvantages of known devices.

Accordingly, the present invention provides a filter unit for filtering particulates and other foreign matter from a water supply, comprising a filtering chamber, at least a portion of an exterior of the filtering chamber being provided with a mesh through which water may enter the filtering chamber in use, the mesh being sized to filter particulates and other foreign matter from the water, the filter unit further comprising an outlet through which filtered water exits the filter unit, and a rotatable member located within the filtering chamber, the rotatable member having at least one outlet spaced from an internal face of a mesh, the axis of rotation of the rotatable member being such that the at least one outlet traverses at least a substantial portion of the internal face of a mesh, the filter unit further comprising a dedicated pump having an inlet communicating with the filtering chamber and an outlet communicating solely with the rotatable member such that operation of the pump causes filtered water from within the filtering chamber to be pumped through the rotatable member to exit the at least one outlet and impinge on the internal face of the mesh so as to cause particulates and other foreign matter located on an external face of the mesh to be dislodged.

The present invention also provides a filter unit assembly comprising a filter unit as provided above and a tank housing in which the filter unit is located, the tank housing being provided with an inlet for entry of water into the tank unit and the outlet of the filter unit forming the outlet of the tank housing.

The present invention further provides a filtration system comprising one or more filter units assemblies as provided above.

The present invention further provides a method of filtering water to remove particulates and other foreign matter comprising the steps of passing the water through a filtering chamber having a mesh sized to filter the particulates and other foreign matter from the water, outputting the water from the filtering chamber through an outlet of the filtering chamber, wherein a dedicated pump is used to pump water from the filtering chamber exclusively through a rotatable member located within the filtering chamber to exit through at least one outlet of the rotatable member to impinge on an interior face of the mesh so as to dislodge particulates and other foreign matter located on an exterior face of the mesh.

The present invention further provides a filtration system for filtering particulates and other foreign matter from a water supply, comprising a tank with an inlet and an outlet, a filtration unit through which water must pass to reach the outlet, and a sump in which particulates and other foreign matter from the water accumulates, the sump having an outlet, a drainage conduit communicating with the outlet, a pump for withdrawing water and accumulated particulates and other foreign matter through the outlet and discharging it to a drainage conduit, and a programmable controller for operating a valve and pump.

The present invention further provides a filtration system for removing particulates and other matter from a water supply, comprising:

a) foam reactor means;
b) biological filtration means;
c) aeration means;
d) ultraviolet (UV) sterilisation means;
e) screen filtration means; and
f) heat exchange means mounted one above the next in a tower configuration, wherein the screen filtration means includes an inlet for receiving water to be filtered, the heat exchange means includes an outlet for delivering filtered water and a return conduit connects the foam reactor means to the heat exchange means such that water passes upwardly through the unit from item (e) to item (a) and then downwardly to item (f).

Embodiments of the present invention will now be described, by way of example only, with reference to the accompanying drawings in which:

FIG. 1 is a side elevation of a filter unit in accordance with the present invention;

FIG. 2 is a further side elevation of the filter unit of FIG. 1 with certain parts omitted for clarity;

FIG. 3 is a cross-sectional elevation of the filter unit of FIG. 1, again with certain parts omitted for clarity;

FIG. 3b is a plan view of the filter unit of FIG. 3a;

FIG. 4 is a top plan view of the filter unit of FIG. 1, showing hidden components in broken lines;

FIG. 5 is a cross-sectional detail of part of the filter unit of FIG. 3;

FIG. 6 is a cross-sectional detail of another part of the filter unit of FIG. 3;

FIG. 7 is a cross-section detail of a further part of the filter unit of FIG. 3;

FIG. 8 is a side elevation of a rotor as used in the filter unit of FIG. 1;

FIG. 9 is a top plan view of the rotor of FIG. 8;

FIG. 10 is a perspective view of a detail of the rotor of FIG. 8;

FIG. 11 is a top plan view of an inlet conduit as used in the filter unit of FIG. 1;

FIG. 12 is a cross-sectional side elevation of the inlet conduit of FIG. 11;

FIG. 15 is a schematic elevation of the filter unit of FIG. 1 in a third type of tank housing connected to a biological cleaning stage housing;

FIG. 17 is a schematic elevation of an alternative tank housing in accordance with the present invention;

FIG. 18f is a cross-sectional view of another filtration unit in accordance with the present invention;

FIG. 19 is a cross sectional view of another filtration unit in accordance with the present invention; and FIG. 20 is a schematic view of a filtration system in accordance with the present invention.

Figure 3A:
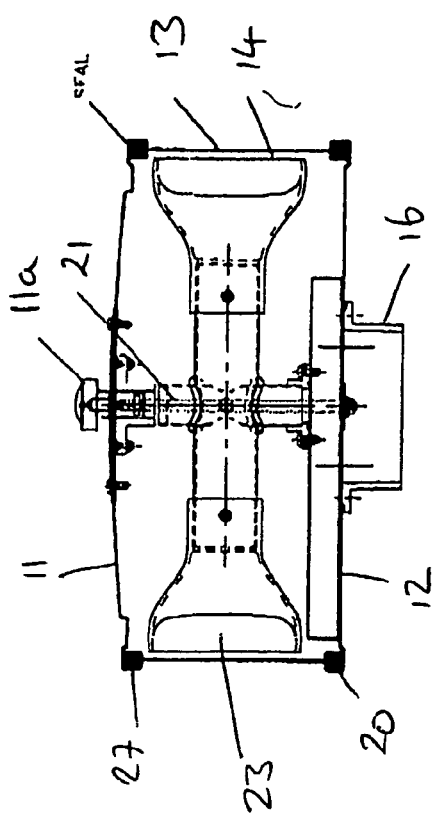
FIG. 3a is a cross-sectional elevation of an alternative filter unit, again with certain parts omitted for clarity.

Referring to FIGS. 1 to 3, a filter unit 1 in accordance with the present invention comprises a filter unit housing 10 having circular upper and lower covers 11, 12. A mesh 13 extends around the circumference of the filter unit housing 10 extending between the upper cover 11 and lower cover 12. The upper cover 11, lower cover 12 and mesh 13 together define a cylindrically shaped filter chamber 9.

Preferably the materials of the filter unit, except where otherwise mentioned, are made of stainless steel grade 316.

An outlet 15 is provided at a centre of the filter chamber 9 in the lower cover 12. A rubber sleeve 16 located at an end of the outlet 15 allows the outlet of the filter chamber 9 to be connected to a pipe or other conduit of varying diameter from approximately 7.5 cm to 15 cm.

Referring to FIGS. 3 to 7, the mesh 13 is mounted to the upper cover 11 and lower cover 12 by means of tie brackets 33. Each tie bracket 33 comprises an elongated strip of metal having an inturned flange at either end. The mesh 13 is spot welded to a number of tie brackets 33. The mesh and tie bracket assembly is then connected to the upper cover 11 and the lower cover 12 by virtue of bolts 28, 26. A 'watertight' seal is provided by annular seals 20, 27 provided in annular channels 34, 35 formed in the upper cover 11 and lower cover 12 respectively. As seen in FIGS. 5 to 7, the mesh 13 protrudes into the upper and lower seals 27, 20 to form an improved connection. As a result water can only enter the filter chamber 9 through the mesh 13.

Figure 6B:
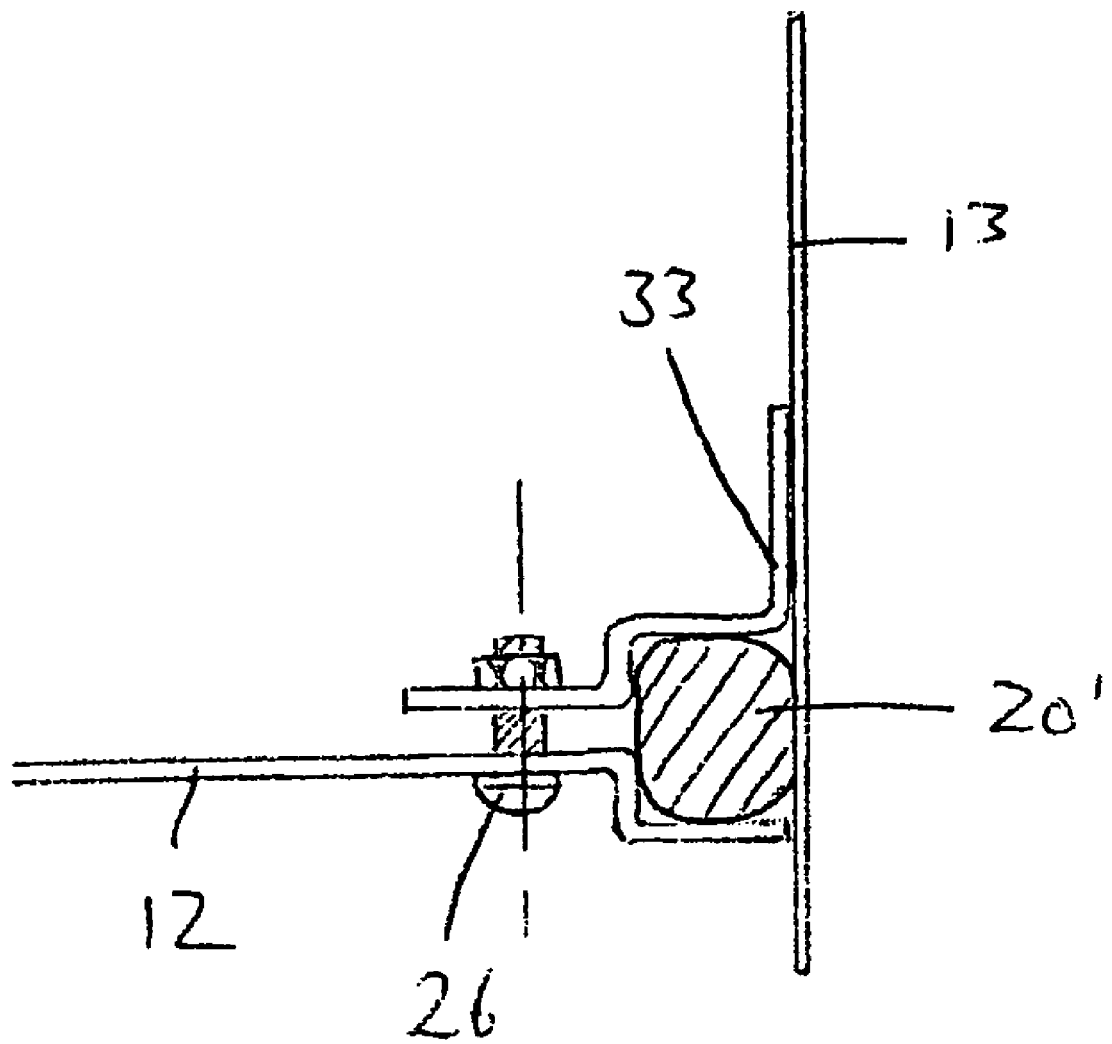
FIG. 6b is a cross-sectional detail of an alternative part to that of FIG. 6.

An alternative seal is illustrated in FIG. 6b wherein the annular channel is dispensed with. Instead an enlarged gasket or o-ring 20' is provided which is sandwiched between the tie bracket 33 and lower cover 12 as the bolt 26 is fastened. As a result the O-ring 20 bulges outwards to form a face seal against the mesh 13. This seal may be used on the upper and lower covers 11, 12.

The mesh 13 is also made of stainless steel grade 316. The aperture size of the mesh 13 can be varied depending on the required degree of filtration. However, in accordance with the present invention aperture sizes of 200 microns or less can be utilised. One form of mesh 13 is a Hollander weave mesh of aperture size 100 microns. The Hollander weave construction has been found to offer good resistance to work hardening and fatigue failure. Other mesh types such as wedge wire screen (also known as triangular bar screen) and plain weaves may be used. The mesh 13 may also be made of nylon of a suitable thickness.

A rotatable member in the form of a rotor 14 is provided within the filter chamber 9 having an axis of rotation which is substantially vertical and coincident with the major axis of the cylindrical filter chamber 9. The rotor 14 is mounted to the upper cover 11 and lower cover 12 by bolts.

Referring to FIGS. 8 to 10, the rotor 14 of the filter unit 1 comprises a vertically orientated hollow rotor shaft 21 and a hollow rotor arm 22 which extends substantially perpendicular thereto. Preferably, the rotor arm 22 and rotor shaft 21 are welded together. At each distal end of the rotor arm 22, there is provided a rotor nozzle 23. Each rotor nozzle 23 comprises an outlet 29 which is angled at an angle $\alpha$ (alpha) to a radial direction 36 passing coincident to the rotor arm 22 as shown in FIG. 9. Angle $\alpha$ may be varied substantially 0 and 90 degrees. Preferably, a is between 35 and 50 degrees. In one example the two outlets 29 are both set with an $\alpha$ of 45 degrees. The two outlets 29 may be set at different angles; for example, one outlet may have an $\alpha$ of 35 degrees and the other 50 degrees. Alternatively, one of the outlets may be at 0 degrees and the other outlet at an angle greater than 0 degrees.

Figure 9A:
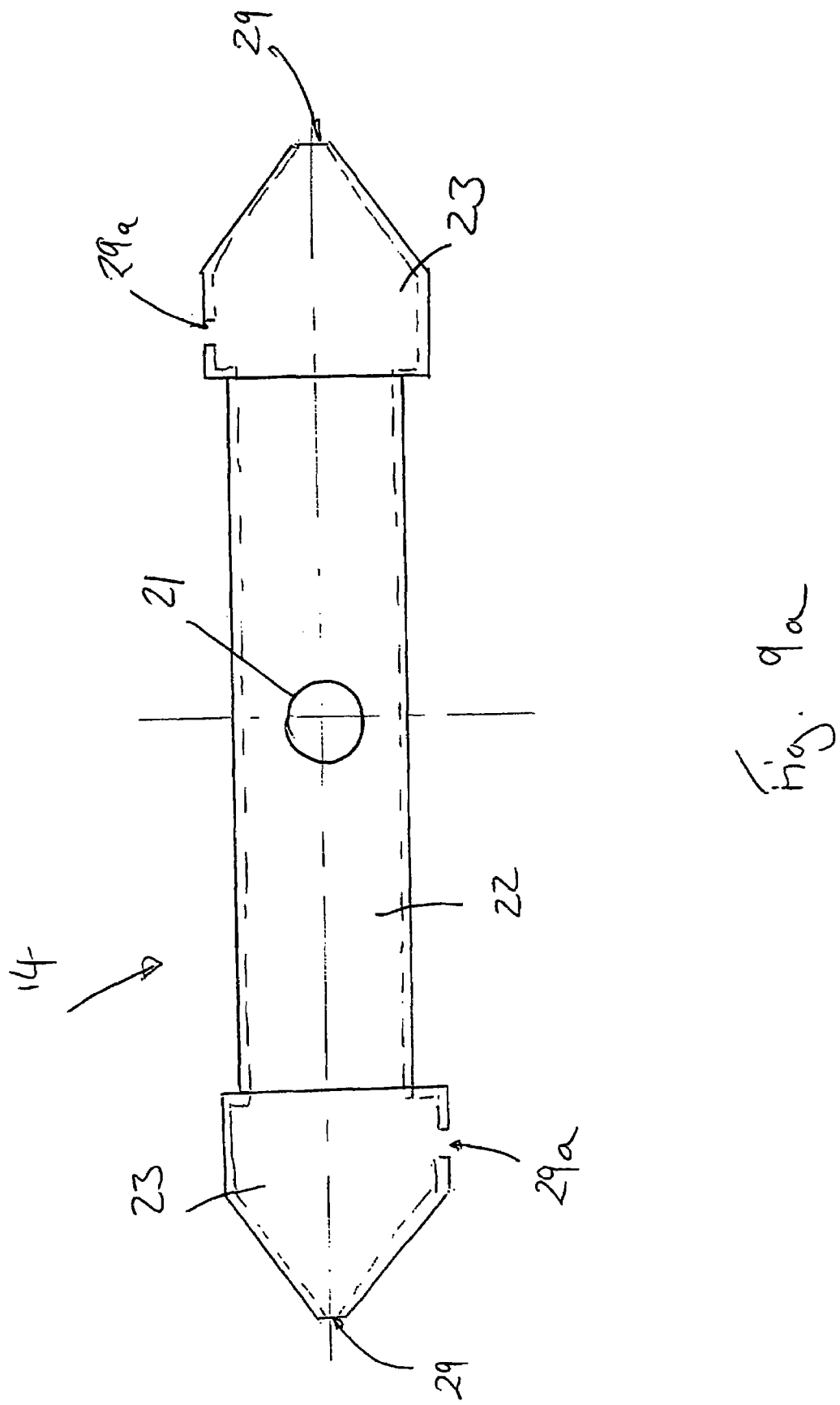
FIG. 9a is a top plan view of an alternative rotor.

Alternatively, as shown in FIG. 9a, the nozzle outlets 29 may be set at 0 degrees and one or more openings 29a provided in the side walls of the nozzle 23 through which a proportion of the water passes in order to rotate the rotor 14.

Preferably, the rotor nozzles 23 are also fan-shaped in the vertical dimension as shown in FIG. 8 such that the distal end of each of the rotor nozzles 23 is wider than the proximal end connected to the rotor arm 22. The rotor nozzles 23 may be partially closed across part of its width such that the nozzle outlet at one end of the rotor 14 sweeps the upper half of the mesh 13 and the opposite nozzle 23 sweeps the lower half of the mesh 13. This arrangement has the advantage that a lower water pressure is required.

A pump 17 is provided attached to an exterior of the filter unit housing 10. An inlet of the pump 17 is connected to an interior of the filter chamber 9 by means of an aperture 32 in the lower cover 12 (as shown in FIG. 4). An outlet of the pump 17 connects solely to the rotor 14 via an aperture 31 in the lower cover 12 and an inlet conduit 19. The pump 17 is consequently dedicated to supplying water to rotor 14.

The pump 17 is preferably an electric pump powered by an external power source. The pump has a rating of greater than 2,000 liters per hour and preferably greater than 4,000 liters per hour. One example of a suitable pump is the 'Nautilus 6,000' pump manufactured by Oase having a rating of 6,000 liters per hour.

Referring to FIGS. 11 and 12, the inlet conduit 19 of the filter unit 1 is provided with a first aperture 31a and a second aperture 30a. When positioned in the filter unit 1, the first aperture 31a coincides with the aperture 31 in the lower cover 12 which provides a connection with the outlet of the pump 17. Likewise, the second aperture 30a is coincident with a base of the hollow rotor shaft 21. As such, the outlet of the pump 17 communicates with the interior of the rotor 14 via the pump outlet aperture 31, aperture 31a, internal conduit 19, aperture 30a and rotor shaft 21.

An air bleed valve 18 is provided in upper cover 11 to allow air trapped in the filter unit 1 during installation to be bled off.

Figure 13:
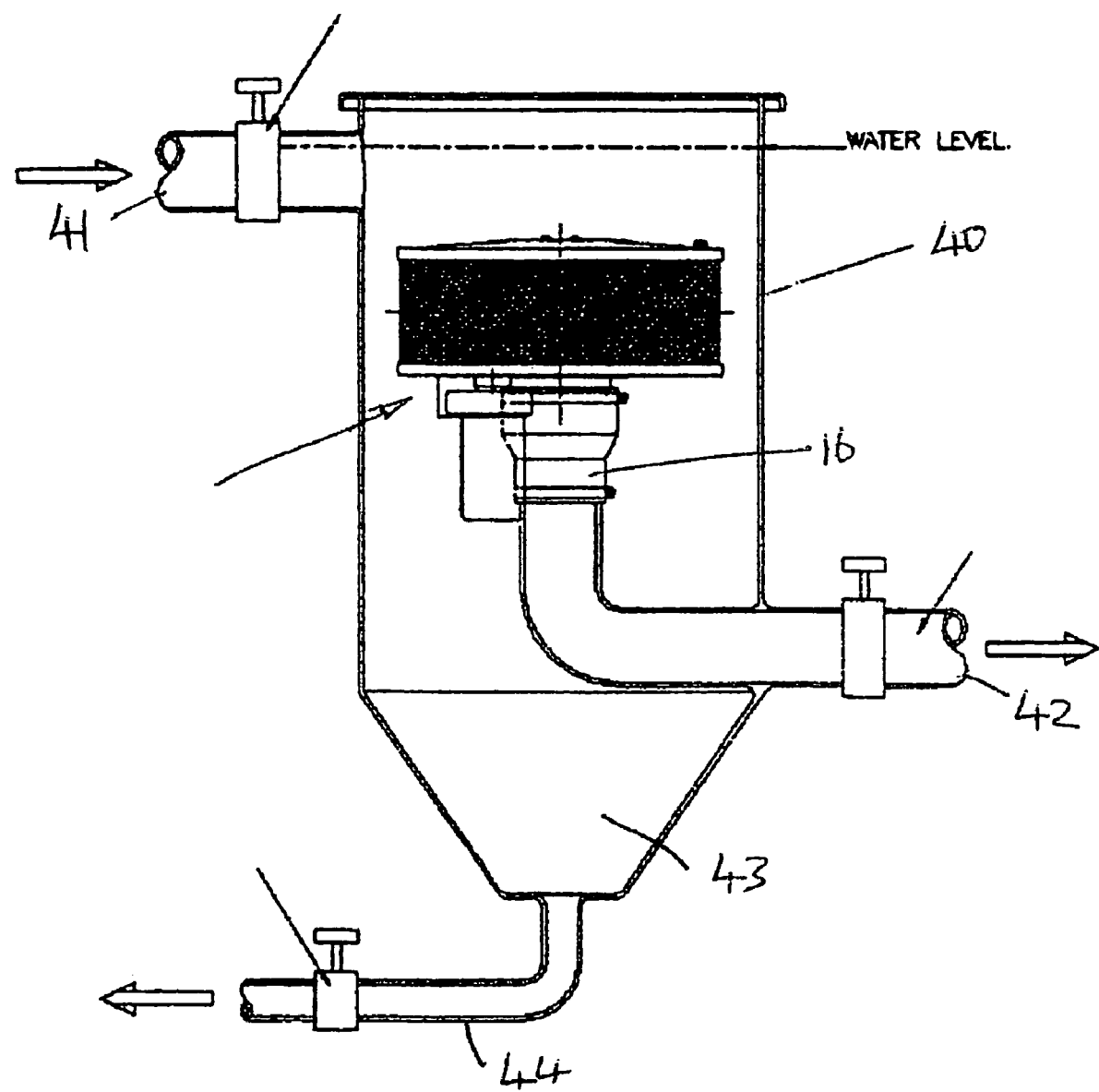
FIG. 13 is a schematic elevation of the filter unit of FIG. 1 in a first type of tank housing.

The filter unit 1 is installed in use in a tank housing 40 to form a filter unit assembly. FIG. 13 shows a first type of tank housing 40 which comprises an inlet 41 located at or near a top of the tank housing 40, an outlet pipe 42 and a sump 43 provided with a bottom drain line 44. The filter unit 1 is installed in the tank housing 40 with the outlet 15 being connected to the outlet pipe 42 by means of the rubber sleeve 16 and a jubilee clip. The tank housing 40 is then filled with water from inlet 41. During this stage the bleed valve 18 may be operated to remove any air trapped in the filter unit 1.

In operation, there is a flow of water from the inlet 41 to the outlet pump 42 such that the filter unit 1 is surrounded by water to be filtered. Advantageously, locating the inlet 41 at or near the top of the tank housing 40 causes an overall movement of water downwardly through the tank housing 40 towards filter unit 1 which aids removal of particulates and other foreign matter from the mesh 13 and speeds up settling of the debris in sump 43. In addition, the conical shape of the sump 43 aids downward movement of the debris towards the bottom drain line 44.

The filter unit assembly may be either gravity-fed or an actively pumped filtration assembly. Either due to the force of gravity or due to the action of the active pumping, water is passed through the tank housing 40 and filter unit 1 by entering through mesh 13 and exiting through outlet 15 into the outlet pipe 42.

At the same time, pump 17 is operated to pump water solely through rotor 14. The water pumped by pump 17 originates from within the filter chamber 9 and is therefore free of any particulates or other foreign matter larger than the aperture size of the mesh 13. Water is pumped into the pump 17 via the inlet aperture 32 in the lower cover 12 and pumped out of the pump outlet aperture 31 only into the inlet conduit 19 and rotor shaft 21. The pumped water is then forced along both arms of the rotor arm 22 and out of the rotor outlets 29 of rotor nozzles 23. Due to the angle α of the outlets 29 of the rotor nozzles 23, the outflowing water causes the rotor arm 22 to rotate. The water outflowing from the rotor outlets 29 is directed against an interior face of the mesh 13 before passing therethrough. This flow of water causes particulates and other foreign matter lodged on the outer exterior face of the mesh 13 to be dislodged and to fall away from the mesh 13 into sump 43. Periodically the bottom drain line 44 is opened to remove the collected waste material.

Advantageously, since the flow of water through the rotor 14 is not taken from the outlet 42, operation of the rotor 14 does not produce a decrease in the volumetric flow rate or efficiency of the filter unit 1.

Figure 13A:
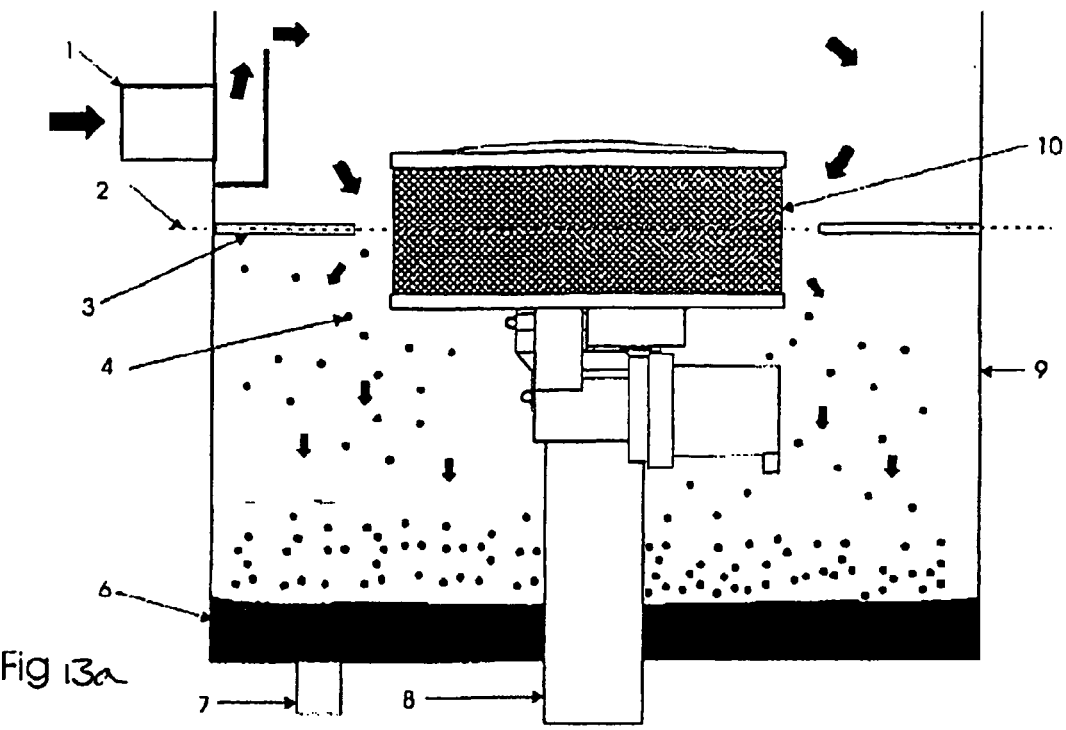
FIG. 13a is a schematic elevation of another filter unit assembly in accordance with the present invention.

A modified type of tank housing 540 is shown in FIG. 13a in which a plate, insert or partition 511 is located. The filter unit 1 is positioned such that its mid-point is level with the partition 511. An orifice 512 is provided in the partition 511 in which the filter unit 1 is located. The partition 511 promotes downward flow within the tank housing 540 due, in part, to the pressure gradient across the partition due to a venturi effect. The downward flow helps the settling of solids in the sump of the tank housing 540 and also helps prevent the water below the partition 511 being disturbed by the water entering the tank housing through the inlet. Further, the partition 511 ensures that the water entering the tank is directed towards the mesh 13 of the filter unit 1 for filtration.

For maximum efficiency, the radius of the orifice 512 has been found to be as follows:

$$R_0 = \sqrt{((nr^2 + 3\eta)n)}$$

where
$R_0$ = radius of orifice
$r$ = radius of filter in centimeters and
$\eta$ = flow rate through filter in liters.

This formula can also be used to determine the radius of the tank housing in the version shown in FIG. 13, for example.

Figure 13B:
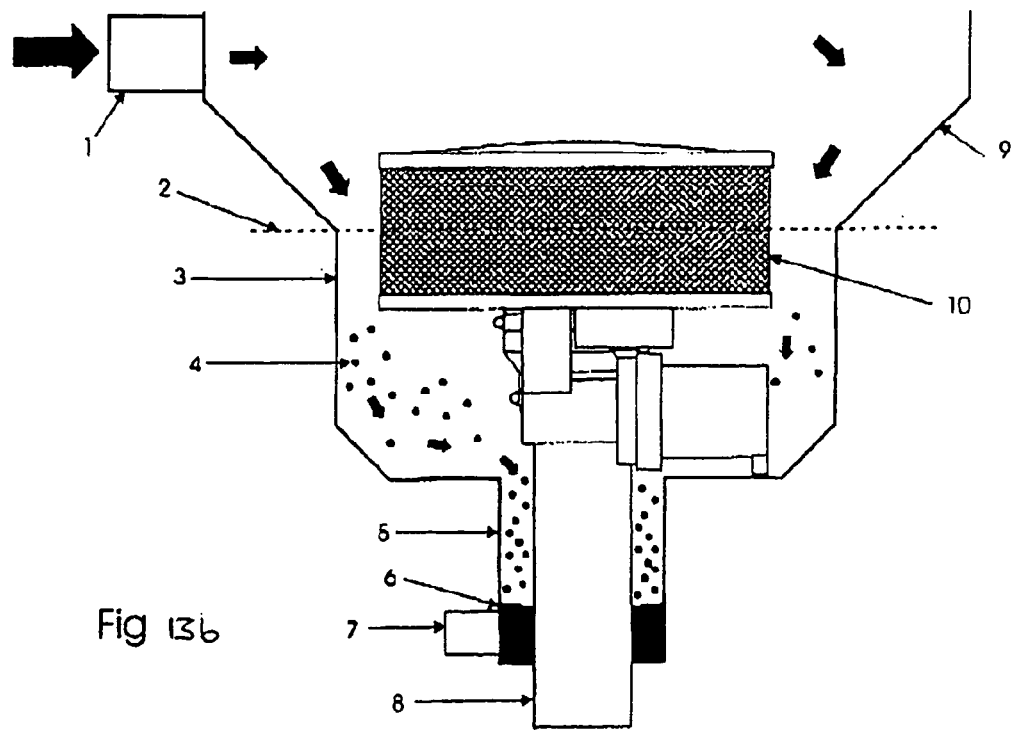
FIG. 13b is a schematic elevation of another filter unit assembly in accordance with the present invention.

Another variant of the tank housing is shown in FIG. 13b. In this variant the function of the partition 511 has been incorporated as part of the internal shape of the housing itself. An upper region 515 of the housing is frusto-conical in shape. A lower region 516 is cylindrical in shape. The junction between the upper region 515 and the lower region 516 is located level with the mid-point of the filter unit 1. This has the same effect as in the previously described variant of creating a pressure gradient which encourages downward flow of water within the tank housing.

In addition, the tank housing comprises a sump 517 which has a much reduced cross-sectional area. This has the result of reducing the amount of water which must be emptied from the tank housing when clearing the sump 517. In addition, the water exiting the sump 517 into drain line 518 will speed up due to the restriction in diameter. The high velocities produced ensure that all the collected debris is efficiently removed whilst only using a small volume of water.

Figure 14:
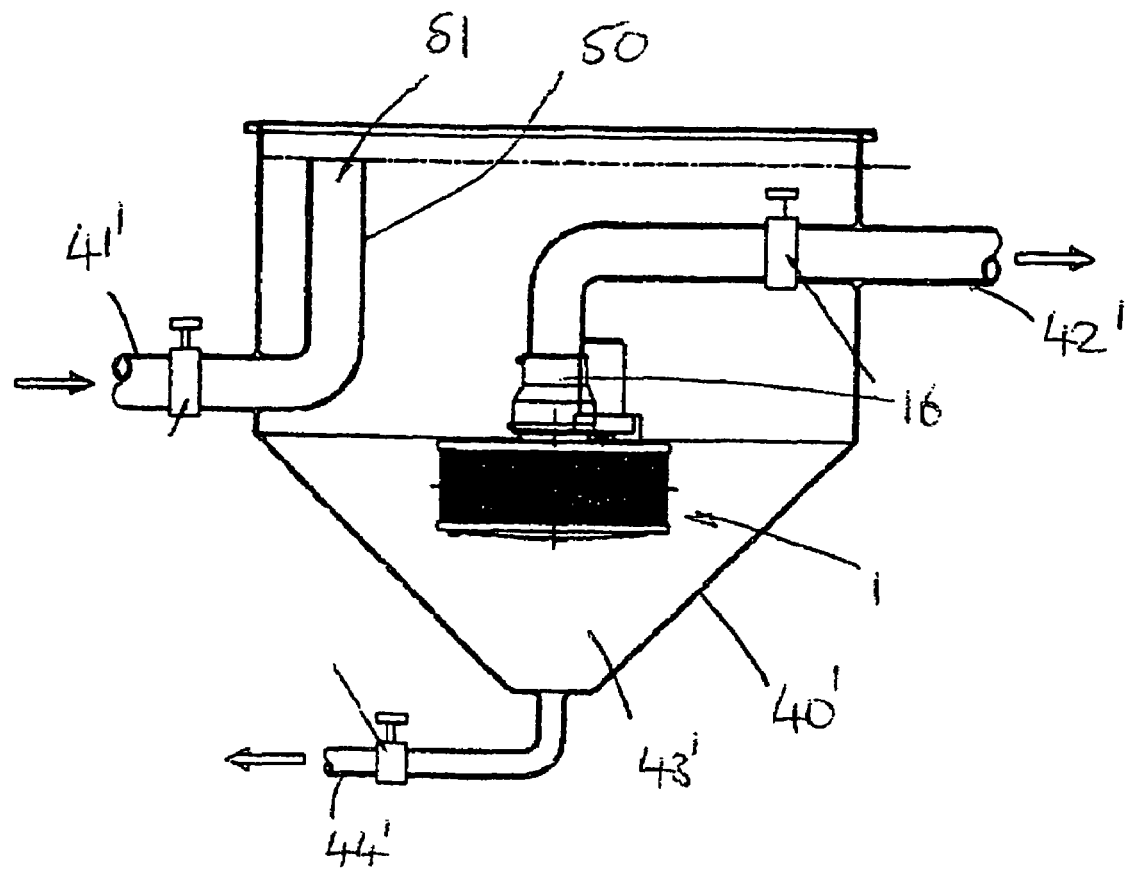
FIG. 14 is a schematic elevation of the filter unit of FIG. 1 in a second type of tank housing.

FIG. 14 show another type of tank housing 40' in which the filter unit 1 may be installed. This type of installation occurs typically where an already fitted 'vortex' type filter unit is converted to operate with the filter unit 1 of the present invention. The installation shows how the filter unit 1 may be orientated upside-down without impairing performance. The inlet 41' is also provided with a 90 degree elbow pipe 50 to move the effective inlet 51 of the tank housing 40' to at or near the top of the housing. It has been found that increased performance of the filter unit 1 occurs where the tank housing 40' is filled in a non-vortex producing manner such that the inflowing water fills the tank housing 40' from the bottom up without a significant water flow in the radial or tangential directions. However, the filter unit 1 may be used in a vortex tank housing.

FIG. 15 illustrates a third type of tank housing 40" in which the filter unit 1 of the present invention may be installed. The outlet 42" of the tank housing 40" is provided with a secondary pump 54 separate from the dedicated pump 17 of the filter unit 1. The secondary pump 54 operates to drive water through the tank housing 40". The figure also illustrates how biological filtering or cleaning stages 55 my be arranged in series with the filter unit assembly of the present invention to form an integrated filtration system.

Figure 15A:
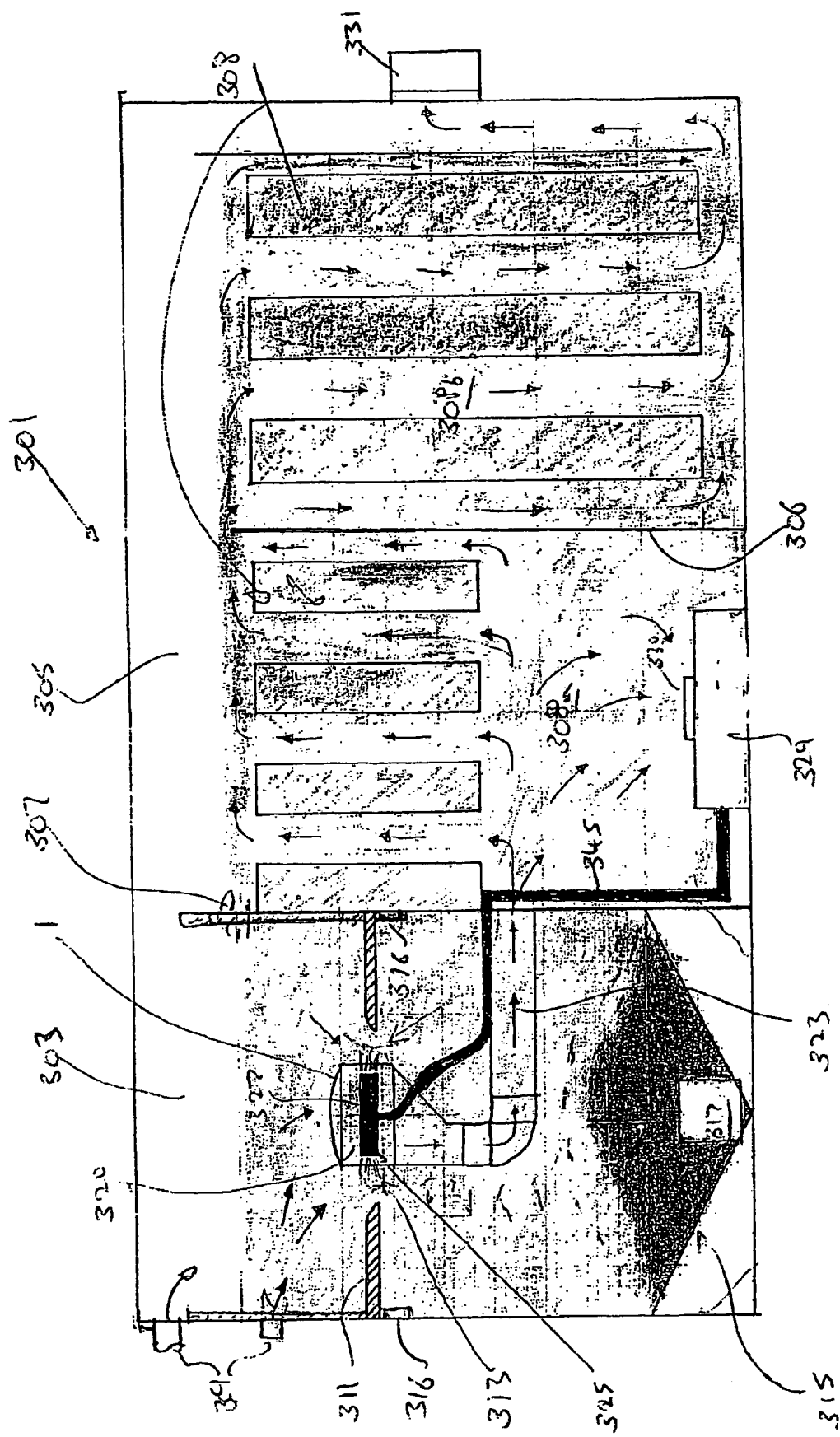
FIG. 15a is a diagrammatic side view of another embodiment of the present invention.

FIG. 15a illustrates a further embodiment according to the present invention wherein the filter unit 1 is installed in a tank having a base and four sidewalls and an open top which is preferably provided with a cover 302. The tank is divided into first and second sections 303, 305, by a wall 307. The particulate material is removed in the first section and the second section contains bio-mass 308 for biologically purifying the water. The bio-mass section 308 is itself divided into two sections 308a, 308b, by a partition wall 306. The first section comprises a chamber which receives water to be filtered via an inlet port 309. The chamber is divided intermediate its upper and lower extremities by a partition wall 311 which has an orifice 313. The lower part of the chamber has a tapered configuration defining a sump 315 at the bottom thereof for the collection of particulate material. A valved outlet 317 can be opened to facilitate the removal of particulate material. The partition wall is formed by the base of a four sided tray 314 having a continuous periphery. The tray is preferably removable. The tray fits into the upper end of the first section and is supported on a ledge 316. The top edge of the tray allows the water level in the first section to be higher than that in the second section.

The filter unit 1, of the type described in the above embodiments, opens into the second section 305. The outlet of the filter unit 1 opens into a passageway 323 which opens into the second section 305. The filter unit 1 is positioned in the orifice 313 in the partition. The purposes of this will be described further herein.

The second section 308b has an outlet port 331 for filtered and purified water. It may be provided with a slide valve to control the flow rate and the water level in the two bio-mass compartments 308a, 308b.

Figure 15B:
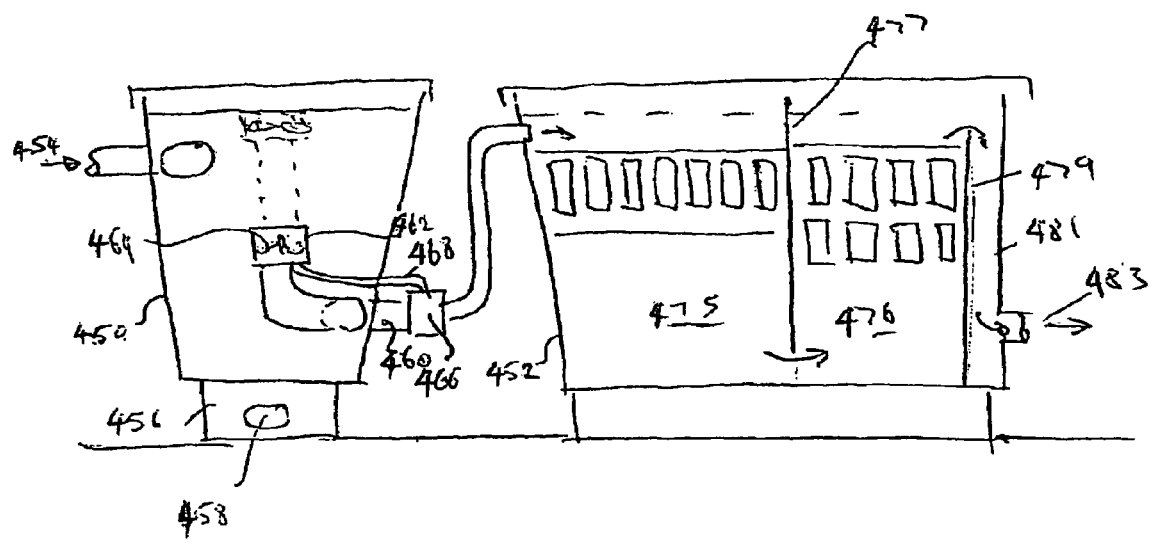
FIG. 15b is a further embodiment of the present invention.
Figure 15C:
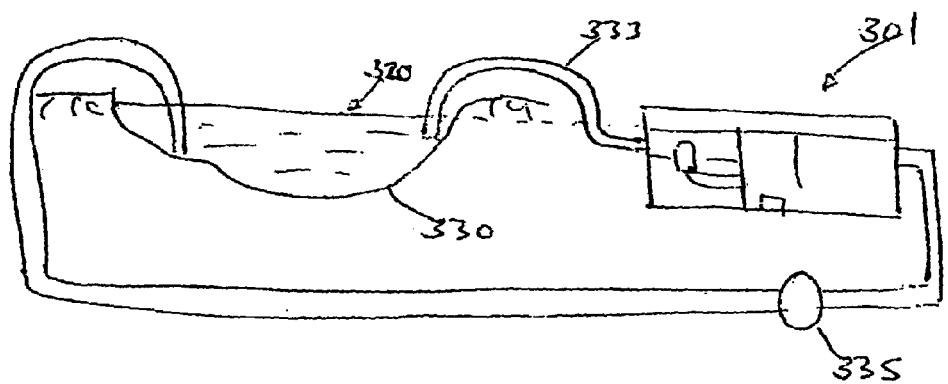
FIG. 15c shows the apparatus of FIG. 15a in a gravity-flow filtration system.

FIG. 15c illustrates the apparatus of FIG. 15a in conjunction with a pond 330 whose water is to be filtered and purified. In the illustration the tank is connected to the pond 330 by way of a pipeline 333 and is positioned such that the level of water in the tank will be determined by the level of water W in the pond. A pump 335 generates the circulation in the system by pumping finally filtered water from the outlet of the tank back to the pond. In operation water to be filtered enters the first section of the tank and the operation of the pump 335 causes water to be drawn through the screen filter unit 1. The water below the partition 311 is relatively calm whereas the water above is moving. In addition, the positioning of the filter unit 1 within the orifice 313 is such that the water being drawn in generates a pressure drop between one side of the partition 311 and the other. These factors have the effect of causing the particulate material which is dislodged from the screen to sink and, in due course, will settle in the sump 315. The removal of particulate material in this manner has the advantage that particulate material is removed from the pond and yet does not enter the bio-mass and thereby enables a bio-mass to be used which has a smaller particulate size and as a consequence a lesser volume of material can be used to achieve the same purifying effect.

Reference is now made to FIG. 15b, which describes a further embodiment of filtration apparatus. In this embodiment, removal of particulate material is carried out in a catchment tank 450 which comprises a modified vortex/cyclone separator. The biological filter medium is contained in a separate tank 452.

The vortex separator has an inlet 454 in a sidewall thereof. The separator is circular in horizontal section and water is introduced in a manner to set up a swirling motion. The filter separates out large particulate material in a manner which is well known and not described further herein. The particulate matter collects in a sump 456 at the base of the chamber and can be removed by way of a valved outlet 458.

Water is withdrawn from the chamber via an outlet pipe 460 which draws water from the centre of the tank. The inlet to the outlet pipe is provided with a filter unit 1 of the type described in the above embodiments.

In the illustrated embodiment the rotor 14 is supplied with water under pressure from the filtered side of the screen filter. A pump or flow director 466 extracts some of the filtered water and passes it along pipeline 468 to the rotor. As the rotor 14 rotates particulate material is displaced from the screen and will sink down into the sump 456. The vertical position of the filter unit 1 does not have to be limited to the position shown. It may be closer to the top or lower down.

Water is pumped into the inlet 454 of the vortex separator to generate the necessary flow velocity and returned to the pond under gravity having passed through the vortex separator 450 and the biological filter 452. The latter can be of any convenient configuration and is illustrated in FIG. 15b as comprising two sections 475, 476 separated by a partition 477 and leading over a weir 479 to an outlet chamber 481 having an outlet 483. The outlet chamber may incorporate aeration means. A tray 411 in FIG. 15a or similar separator or partition may be incorporated.

Figure 15D:
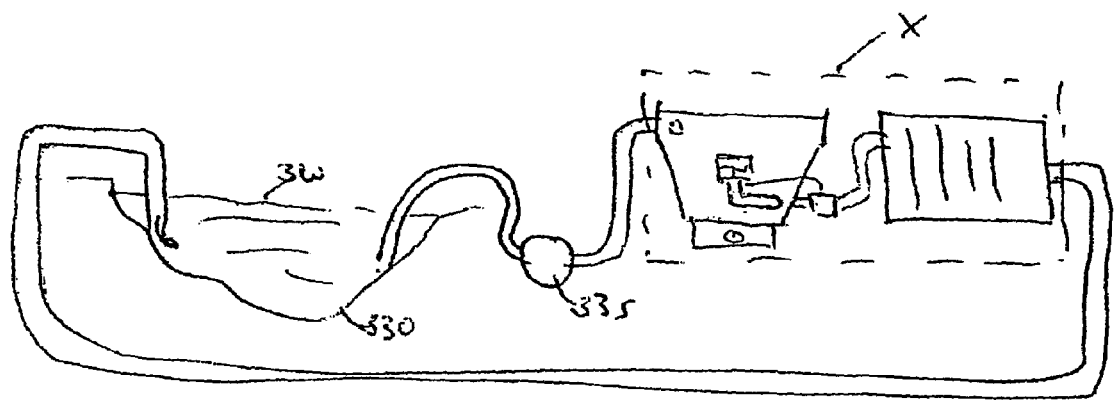
FIG. 15d shows the apparatus of FIG. 15b in a pumped filtration system.

FIG. 15d illustrates how either of the apparatus of FIG. 15a or 15b, represented by filter section X shown in dotted outline, could be used in a pumped circulatory system, i.e., where there is no relation between the level of water in the pond and the level of water in the filtration unit.

Figure 16:
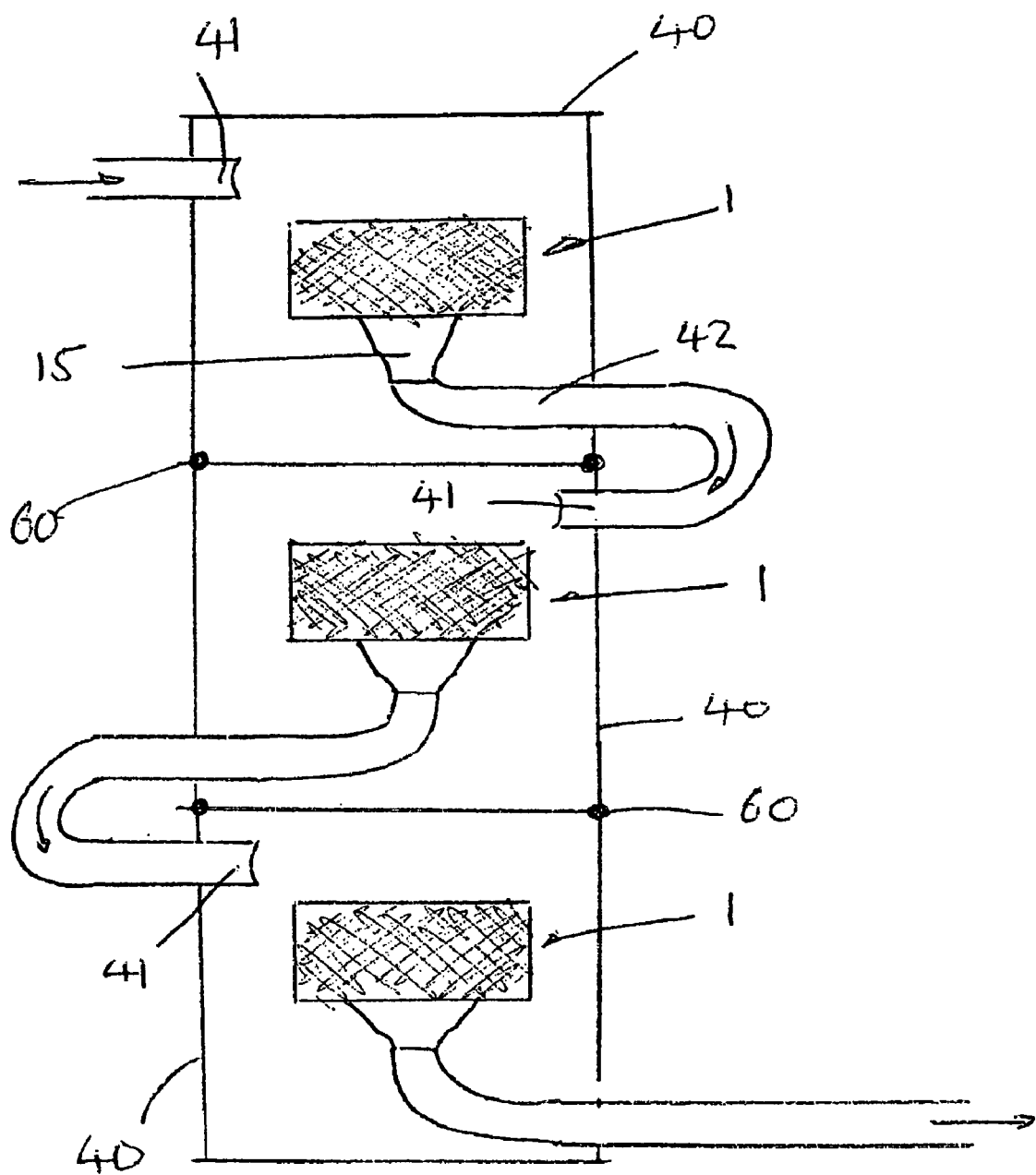
FIG. 16 is a schematic elevation of a plurality of the filter units of FIG. 1 in a vertical stack formation.

FIG. 16 illustrates a further embodiment of the present invention wherein a plurality of the filter unit assemblies are arranged in a vertical stack formation. The outlet 15 of the uppermost filter unit 1 is connected to the inlet 41 of the next lowermost tank housing 40 and so on down to the lowermost filter unit 1 whose outlet 15 is connected to the outlet of the filtration system. Preferably the aperture size of the meshes 13 in the filter units 1 decreases down the stack from a mesh size of 100 microns or greater in the uppermost filter unit to a mesh size of 25 microns or less in the lowermost filter unit. In this way a progressive filtration system is provided.

Adjacent filter unit assemblies may advantageously be joined sealingly with one another with the provision of gaskets or O-ring seals 60. Of course the successive filter unit assemblies may be arranged otherwise than in a vertical formation; for example, they may be arranged horizontally where the filtration system is actively pumped.

FIG. 17 shows a further embodiment of filter unit assembly in accordance with the present invention. The filter unit assembly 110 comprises a tank 112. The tank has an inlet 114 and an outlet 118. A filter unit 1 is located in the tank. Water entering the tank must pass through the filtration unit in order to leave the tank 112 through the outlet 118. A lower portion of the tank forms a sump 120 which tapers towards an outlet 122 and a drainage pipe 124.

The filter unit 1 may be as described in any of the above embodiments. Alternatively, another type of filter unit may be used in tank 112.

A drainage pipe 124 is connected to the outlet 122 of the sump 120 and is arranged with an outlet or vent to atmosphere 140 at a level higher than the level of the inlet 114 into the tank 112. This ensures that the head of water in the drainage pipe 124 is greater than that in the tank 112. Thus, water entering the tank 112 does not simply drain away, cutting off supply to the outlet 118.

However, the outlet 122 from the sump 120 to the drainage pipe 124 may also be closed by a valve 134 of any suitable type such as a gate valve or ball valve.

A pump 136 is provided to pump water and accumulated debris whenever desired (and when the valve 134 is open, if provided) from the sump 120 and along the drainage pipe 124 to waste. The pump may be of any suitable type which is able to operate without fouling due to the debris which may be present in the water.

The valve 134 (if present) and pump 136 are operated by a programmable controller 138 which includes a time clock and which can be preset to activate the valve and pump at desired intervals and for a desired length of time. For example, a conventional domestic central heating timer can be used.

The controller can be set to operate the valve 134 and pump 136 as often as necessary and for as long as necessary. For example, when the system is newly installed and the water to be filtered is particularly laden with particulates and other foreign matter, it may be necessary to clear the accumulated debris every two hours or so, operating the pump for, say, ten minutes each time. Once this initial filtration has occurred, ongoing filtration may require a lower frequency of perhaps twice a day.

Figure 17A:
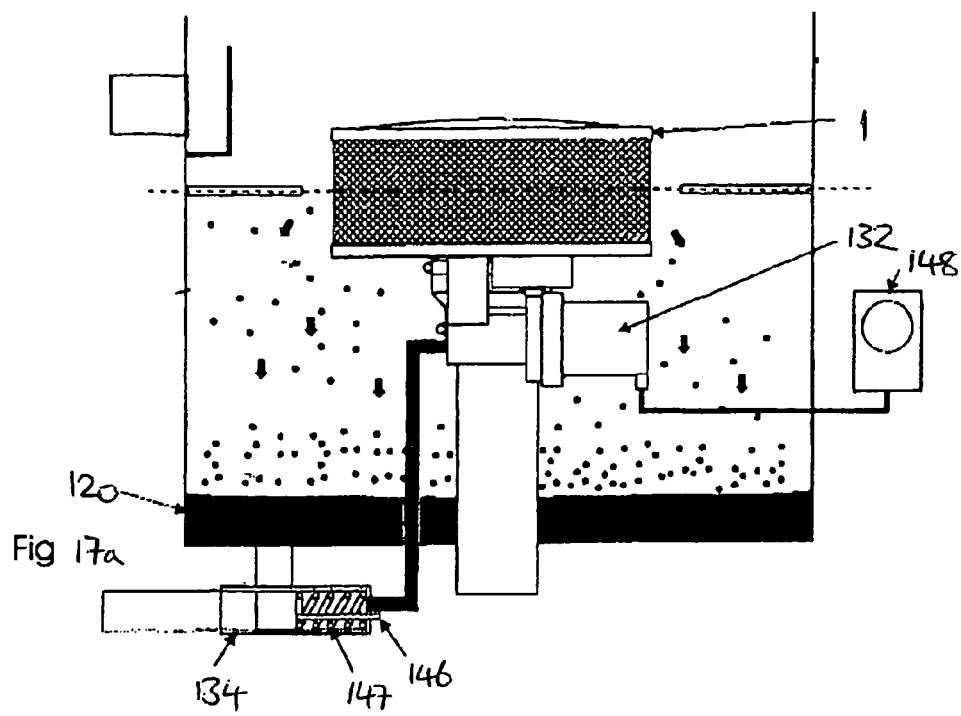
FIG. 17a is a schematic elevation of an alternative tank housing in accordance with the present invention.

FIG. 17*a* shows one variant of tank housing having a sump 120 which can be automatically emptied. The emptying of the sump 120 is controlled by the pressure of the dedicated pump 132 of the filter unit 1. The valve 134 connected to the drain line 124 is held shut by the water pressure from the pump 132 via a transfer means 146. The valve 134 can only open when the pump 132 is switched off. Opening of the valve 134 is caused by action of a spring 147 located in the valve 134. The switching of the pump 132 can be controlled by a timing means such as a segmented time switch 148.

Figure 17B:
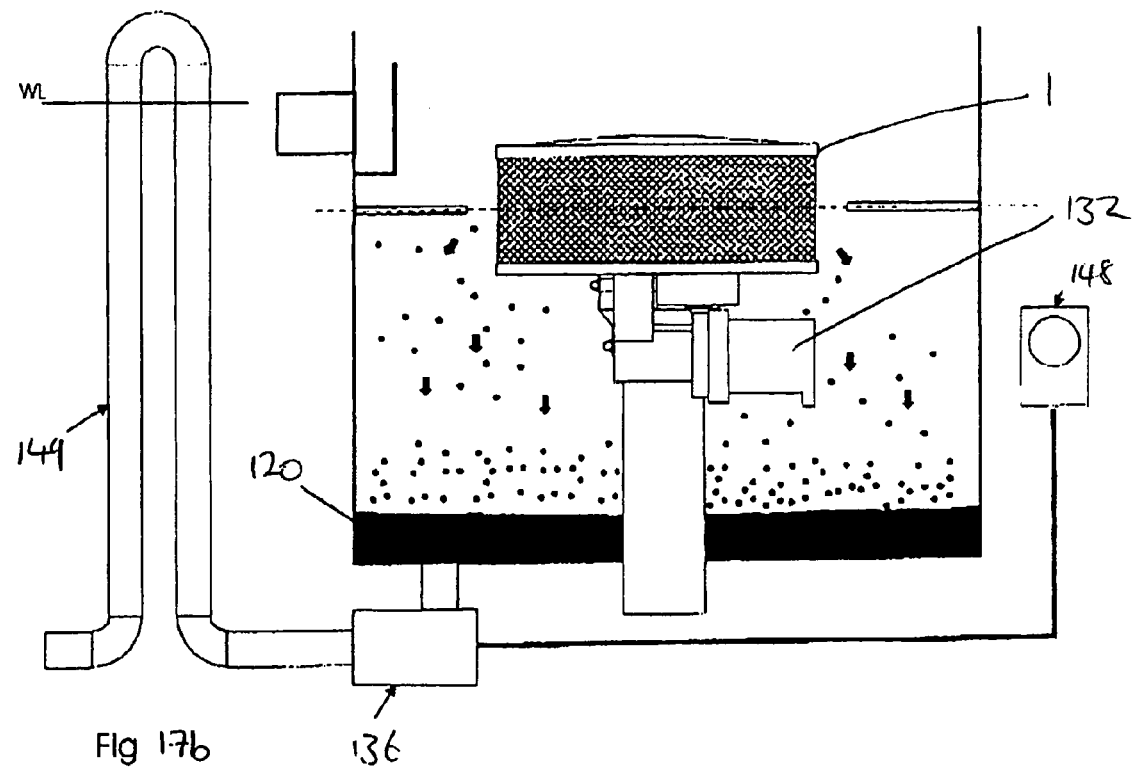
FIG. 17b is a schematic elevation of another alternative tank housing in accordance with the present invention.

FIG. 17*b* shows an alternative arrangement in which a pump 136 is connected to the drain point. The operating times of the pump 136 are controlled by a timing means such as a segmented time switch 148. The outlet of the pump 136 is connected to an upstanding U-bend pipe 149 to prevent drainback of waste water.

It will be apparent that a number of modifications may be made to this embodiment without departing from the scope of the invention. For example, a different type of filtration unit may be used. A filtration system comprising a number of tanks and filtration units through which water passes consecutively may be employed, with each tank including a sump and automated discharge system in accordance with the invention.

Figure 18:
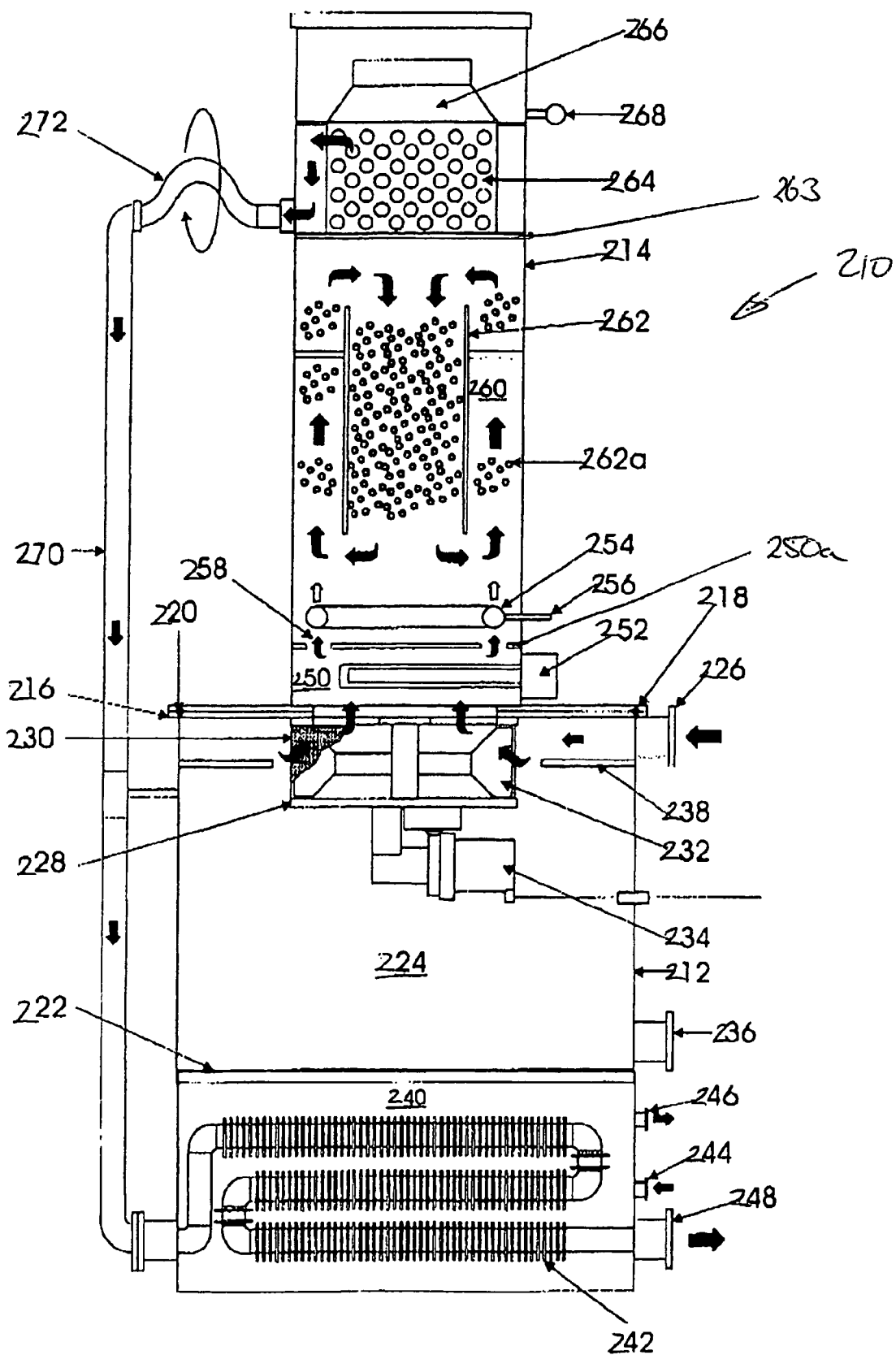
FIG. 18 is a schematic cross-sectional view of a filtration unit in accordance with the present invention.

FIG. 18 shows another embodiment in accordance with the present invention in which a filtration system 210 is built in a tower configuration. To facilitate manufacture, installation and maintenance the system 210 preferably comprises a lower module 212 and an upper module 214, releasably attached together at co-operating flanges 216, 218, with a seal 220 therebetween.

The lower module 212 is separated into two chambers by a wall 222. The wall 222 is insulated to prevent heat transfer to the catchment tank 224. The first chamber constitutes a catchment tank 224 which has an inlet 226 for receiving water to be filtered from a source such as an aquarium or pond. The catchment tank 224 contains a screen filtration unit 228 for removing particulates above a given size of the type described in the above embodiments. Preferably, the screen filtration unit 228 is of the type described in any of the embodiments above. As described above, the dislodged material falls by gravity to accumulate in the bottom of the catchment tank 224 from where it can be removed via a waste outlet 236.

To further increase efficiency, the catchment tank 224 includes a partition wall 238 with an orifice in which the screen filtration unit 228 is located. This creates a Venturi effect which provides a pressure gradient across the screen 230 which encourages particulate material to move downwardly in the direction of the reduced pressure and thus towards the bottom of the catchment tank 224.

The second chamber of the lower module 212, which is located beneath the catchment tank 224, constitutes a heat exchange unit 240. Water which has passed through the screen filtration unit 228, and the other filtration means provided in the upper module 214 as described further below, is returned to the heat exchange unit 240 and passes therethrough in a serpentine-form pipe 242. The pipe 242 may be provided with a ridged wall to increase the surface area available for heat exchange to take place.

The heat exchange unit 240 is heated in any convenient manner, for example by a heated gas which is passed into the chamber via a gas inlet 244 for circulation around the pipe 242 and which can be removed via gas outlet 246 for reheating and recirculation.

The pipe 242 communicates with a water outlet 248 from where the filtered and warmed water can be returned to the aquarium or pond.

The upper module 214 contains further filtration means of various types. Lowermost is an ultraviolet (UV) sterilisation chamber 250. This chamber receives water which has passed through the screen filtration unit 228 and illuminates it with UV radiation from a suitable UV source 252. The UV radiation kills micro-organisms in the water in a known manner.

Above the UV sterilisation chamber 250, an aeration device such as an airstone 254 is provided, separated from the UV sterilisation chamber 250 by a perforated partition 250*a*. The airstone 254 consists of a porous material to which air is supplied from an external source 256. Preferably the airstone 254 is annular in shape, slightly smaller than the internal diameter of the upper chamber 214 and located close to the wall of the upper chamber 214. The air passes through the porous material and bubbles out into the water, preferably in a circular pattern. The airstone 254 forms a partition defining the top of the UV sterilisation chamber 250 and has apertures 258 allowing water to pass up into a biological filtration chamber 260. The bubbles aerate the water and constantly agitate material held in suspension to ensure that it contacts the biological filter described below. Alternatively, an air curtain may be used instead of an airstone.

The biological filtration chamber 260 contains a biological filter 262 which is colonised by bacteria which convert harmful nitrogen byproducts from aquatic animals into less harmful nitrates.

The biological filtration chamber 260 contains biological media 262a which is neutrally buoyant and will only work in a system which has been filtered sown to 100 microns or less. FIGS. 18b to 18e show the properties of the filter media 262a. The media has a cylindrical body 290 that is formed from nylon or a similar material and comprises a plurality of fins 291 on its outer surface. The interior of the body 290 is divided into four equal quadrants 292 by walls 293. The fins 291 act as a safe area for the beneficial bacteria 294 to grow or colonise but also act as a cleaning aid by preventing the sticking of any particles to the media 262a. The quadrants 292 also allow the bacteria to grow and here the bacteria will grow into a 'bio-film'. Once the bio-film has developed to a certain thickness as shown in FIG. 18e the complete layer will fall away from the media 262a and be removed and passed to waste.

The bubbles from the airstone 254 move upwardly within the upper chamber 214 whilst remaining near the inner surface of the wall of the upper chamber 214 as shown by the arrows in FIG. 18. The bubbles are then constrained to move downwardly along the centre line of the upper chamber 214. This has the result of setting up a circulatory flow pattern in the upper chamber 214 which moves the media 262a of the biological filter 262 along with it. Consequently the separate particles of the filter media 262a collide with one another which has a cleaning effect.

Figure 18A:
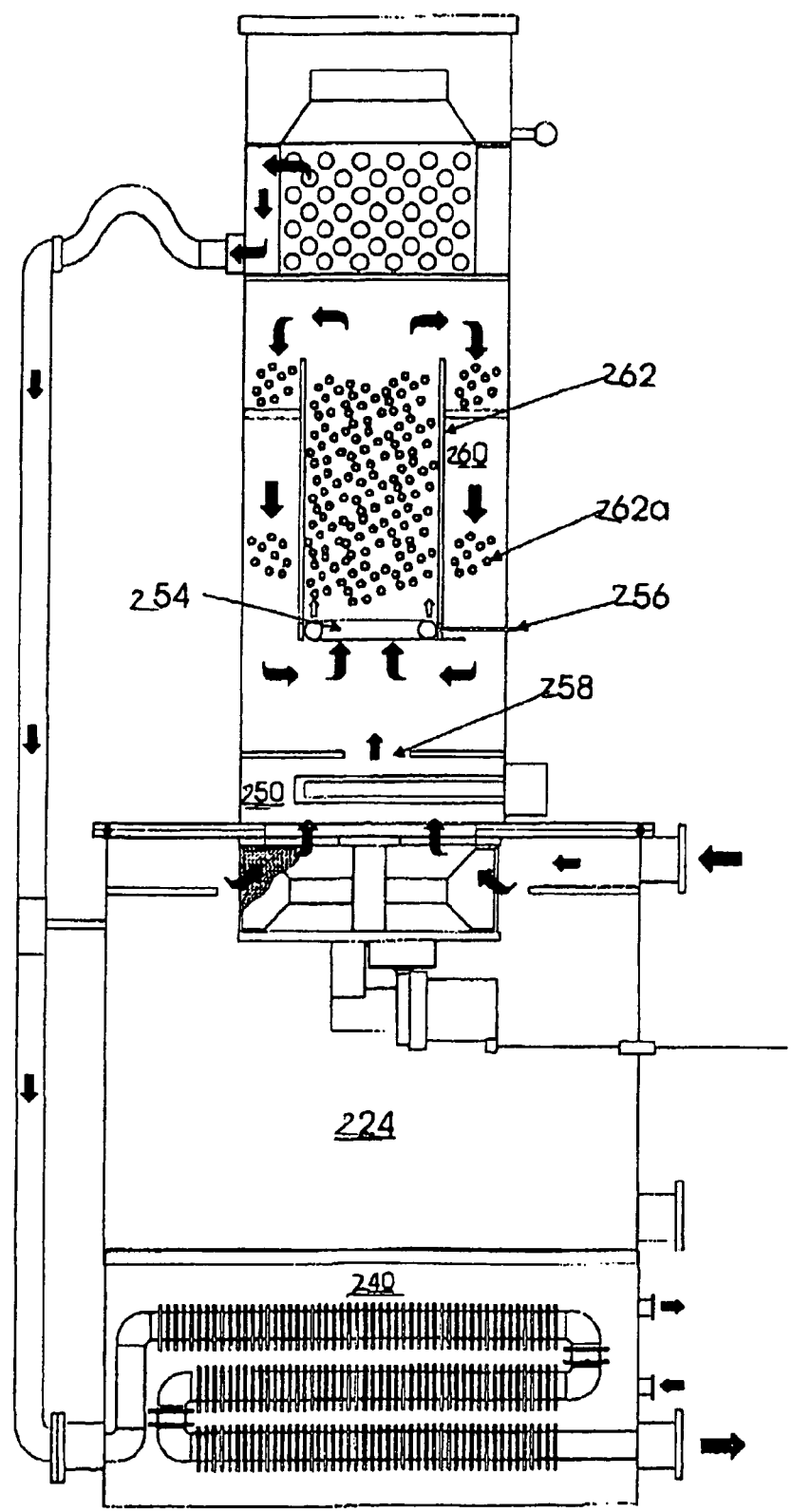
FIG. 18a is a schematic cross-sectional view of another filtration unit in accordance with the present invention.
Figure 18B:
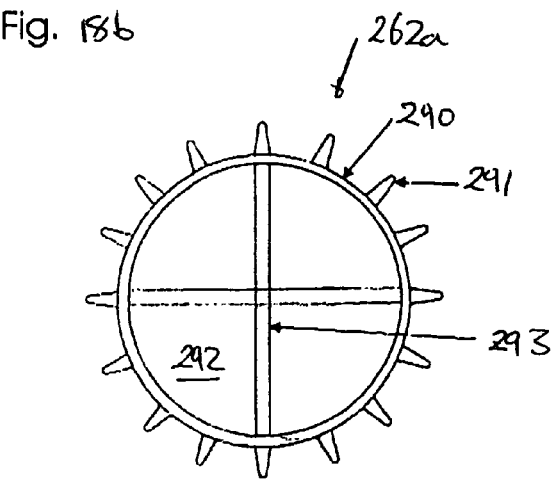
FIG. 18b is a plan view of a filter media for use in the filtration unit of FIG. 18.
Figure 18C:
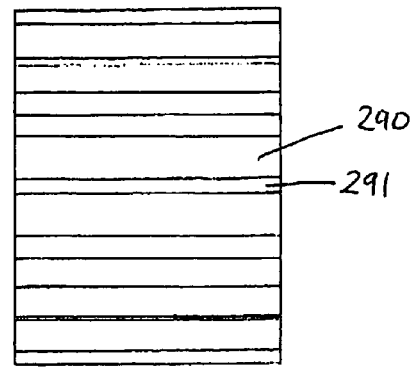
FIG. 18c is a side elevation of the filter media of FIG. 18b.
Figure 18D:
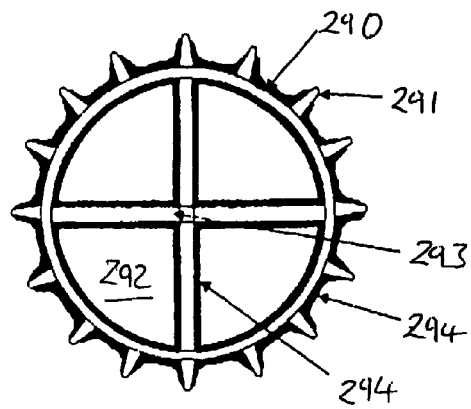
FIG. 18d is a plan view of the filter media of FIG. 18b in another state.
Figure 18E:
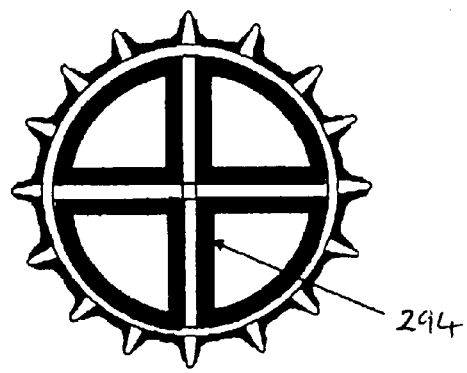
FIG. 18e is a plan view of the filter media of FIG. 18 in another state.

FIG. 18a shows an alternative layout of the apparatus in which the airstone 254 has been moved into the central region of the upper chamber 214. As shown by the arrows, in this version the circulatory flow in the upper chamber 214 is reversed which has the advantage that the contact time between the incoming air and filter media 262a is increased.

Above the biological filtration chamber 260, at the top of the upper module 214, another form of filtration is provided by a foam reactor 264, also known as a foam fractionator or protein skimmer, which is separated from the biological filtration chamber 260 by a perforated partition 263. The perforations in partitions 250a and 263 are small enough to prevent passage of the media 262a. A foam reactor creates air bubbles which trap organic material at the air-water interface. The bubbles are forced into a chamber 266 where they burst and deposit the organic materials which can then be removed via a waste outlet 268. As is known in the art, such foam reactors 264 remove phosphates, nitrates, nitrites, ammonia and other dissolved solids to reduce the growth of algae and blanket weed.

Clean water exits from the foam reactor 264 via a return pipe 270 which returns the water to the heat exchange chamber 240 at the bottom of the unit 210 as described above. Upon exit from the foam reactor 264, a U-bend portion 272 is provided in the return pipe 270. This U-bend portion 272 is rotatable about a substantially horizontal axis as shown to allow the height of water in the foam reactor 264, and the whole unit 210, to be controlled.

In use, water from an aquarium or pond to be cleaned is circulated through the filtration system 210 by a pump (not shown), entering the system 210 initially through the inlet 226 to the catchment tank 224. The water passes through the screen filtration unit 228 and is forced upwardly through the UV sterilisation chamber 250, past the airstone 254, through the biological filter 262 and into the foam reactor 264. Having been thoroughly cleaned by these various means, the water passes through the return pipe 270 to the heat exchange chamber 240 to be heated as desired to suit the habitat required in the aquarium or pond. The cleaned and warmed water leaves the system 210 via water outlet 248 to be returned to the aquarium or pond.

FIG. 18f shows a further embodiment having similar components to the apparatus shown in FIG. 18 but in a different arrangement. The filtration system 210 again comprises a filter unit 228 in a catchment tank 224 which has a wall of varying cross-section as described above in the above embodiment and shown in FIG. 13b. The bottom of the catchment tank 224 is provided with a waste outlet 236. Surrounding the catchment tank 224 is located the biological filtration chamber 260 containing the filter media 262a in the level range shown by arrow C in FIG. 18f. The chamber 260 is located concentric with the catchment tank 224 and preferably formed as a single unit. An airstone 254 or similar device is provided towards the base of the biological filtration chamber 260. A drain 289 is provided to allow emptying, cleaning and refilling of the biological filtration chamber 260. An auto-level device 400 is provided near a top of the catchment tank 224 the use of which will be described below.

A water inlet 226 is provided by which water enters near the top of the catchment tank 224. The outlet 216 of the filter unit 228 outputs into the biological filtration chamber 260 through an anti-media grill 280 which prevents the media 262a passing through into the catchment tank 224. As described above the bubbles from the airstone 254 and the output water from outlet 216 set up a circulatory flow in the biological filtration chamber 260 as shown by the arrows in FIG. 18f.

Water exits the biological filtration chamber 260 through an outlet 248 after passing through a second anti-media grill 280a and is then passed back to the water source or on to further filtration stages if necessary.

Figure 18G:
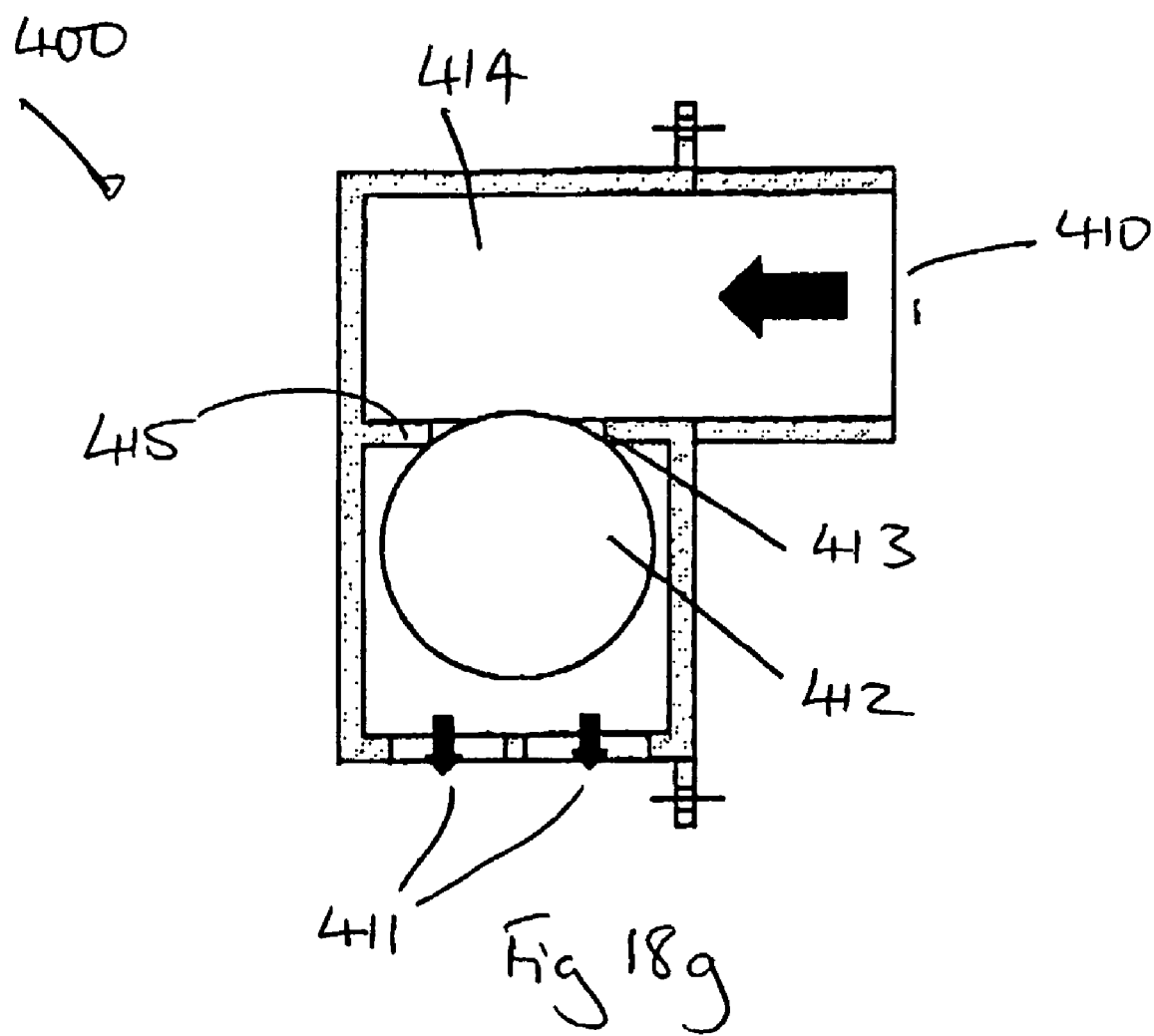
FIG. 18g is a cross-sectional view of part of the filtration unit of FIG. 18g.

As shown in more detail in FIG. 18g the auto-level device 400 comprises a water inlet 410 and spaced water outlets 411 at either end of a conduit 414. The conduit 414 is provided with a partition 415 in which a valve orifice 413 is located. A float ball 412 which is highly buoyant is caged in the conduit 414 on the water outlet 411 side of the partition 415.

In use the water level in the catchment tank 224 and the biological filtration chamber 260 are coincident. Where water is pumped out of outlet 248 of the biological filtration chamber 260 a failure of the dedicated pump of the filter unit 228 would lead to the halting of water flow into the biological filtration chamber 260 through outlet 216. Since the circulatory pump pumping water out of outlet 248 (or gravity in a gravity-fed system) is still operating this can lead to a lowering of the water level in the biological filtration chamber 260 relative to the water level in the catchment tank 224. Eventually the water may stop flowing out of outlet 248 leading to damage to the circulatory pump.

The auto-level device 400 prevents this. When the water level in the biological filtration chamber 260 drops below that in the catchment tank 224 the float ball moves downwardly away from orifice 413 allowing water to pass through conduit 414 from the catchment tank 224 into the biological filtration chamber 260. The movement of the ball 412 also provided a visual indication that a problem has developed with the filter unit 228.

It will be apparent to those skilled in the art that this embodiment of the invention provides an improved filtration system which is compact, space efficient and straight forward to install and maintain. It will also be apparent that various modifications and alterations to the precise details described may be made without departing from the scope of the invention as defined by the claims.

FIG. 19 shows a further embodiment of the present invention in which the tank housing 540 is pressurised, in other words the filter unit assembly is part of a closed system which is not open to atmosphere. An air tight lid 545 is provided to seal the filter unit assembly. Alternatively, the tank housing 540 may be made as a pressurisable unit. The filter unit 1 and assembly may otherwise be as described in the above embodiments. In particular, the unit 1 may be located in an orifice formed in a partition 546, and a sump 543 is provided communicating with a drain line 544. A major advantage of a filter unit assembly which is pressurised is that it may be used in a filtration system that has no loss of head. Such a system is shown schematically in FIG. 20. The output of the filter unit assembly 540 inputs into a biological filter stage 560 which then outputs into a water source 570. Water is supplied from the water source 50 to the filter unit assembly 540 by a circulatory pump 580. Advantageously only one pump is required to circulate water round the whole system. This differs to current systems used in aquaculture where the filtration stage is non-pressurised. Consequently head is lost at the filtration stage and therefore another pump is required to move the water through the biological filter stage and back to the water source 570. Alternatively, and also disadvantageously, the filtration system has to be arranged with large vertical displacements between the stages to develop enough pressure head. The pressurised system of the present invention may all be arranged compactly at one level.

Variations to any of the embodiments described above may be made without departing from the scope of the present invention. For example, the filter unit 1 may be provided with a rotor 14 having only a single outlet 29 or more than two outlets 29. The pump 17 may be provided remote from the filter unit 1 rather than being attached thereto. In the case of multiple filter units 1, a single pump 17 may be used to supply water to all the rotors 14. The mesh 13 has been described as made of stainless steel. However, other materials such as heavy duty plastic may be utilised.

The rating of the dedicated pump 17 may be varied depending on the aperture size of the mesh 13. For example, it may be preferred to use a pump such as the 'Oase USP60'.

Another variation which may be made to the filter unit assemblies of the above embodiments is the provision of a timer switch so as to enable operation of the rotor 14 and pump 17 at periodic intervals as opposed to continuous operation. This has the advantage that the apparatus uses less power. In addition, with the pump 17 switched off, the mesh 13 starts to become blocked by particles in the water. As it does so, the effective aperture size of the mesh 13 decreases leading to the filtration of smaller particles. When the pump 17 is activated the water from the rotor 14 tends to remove the solids on the mesh 13 in the form of 'sheets' which more readily settle out in the sump of the tank housing than do individual particles. The periodic operation of pump 17 is controlled by a switching means such as a simple timer. More advantageously the operation can be controlled by a float switch in the tank housing where the filter unit assembly is actively pumped. As the mesh 13 becomes progressively blocked, the water level in the tank housing starts to rise which eventually triggers the float switch to turn on the pump 17. Where the filter unit assembly is gravity fed, the float switch would be situated in a container downstream of the tank housing. In this case, blockage of the mesh 13 will lead to reduction in the water level in the downstream container thus activating the float switch and pump 17.

Where the filter unit assembly is pressurised, a pressure switch may be used as the switching means.

Advantageously, a switching relay may be used to coordinate operation of the pump 17 of the filter unit and the circulatory pump of the filtration system such that the general circulatory pump is switched off when the dedicated pump of the filter unit is switched on. This has the advantage that the water exiting the rotor 14 and impinging on the mesh 13 does not have to work against an inflow of water through the mesh 13.

Another variation of the filter unit of the present invention is the use of a dedicated supply of water to the rotor 14 of the filter unit 1. In the embodiments described above, the rotor is supplied with water by means of dedicated pump 17. Alternatively a different dedicated supply may be utilised such as a mains water supply or a source of otherwise pressurised water. For example, rotor 14 could be plumbed in communication with a header tank of water having sufficient head to provide adequate water pressure.

In a further variation, an impeller may be located in the supply line which supplies water to the inlet of the catchment tank of the filter unit assembly. The impeller can then be used to provide the motive force for driving water from within the filter unit 1 into rotor 14.

In a further variation, the rotor may be supplied with a dedicated supply of a gas such as air. The gas may be from a compressed gas supply or air powered by an air pump having a rating of 100 liters/minute.

In another variation, the motive force for rotating the rotor 14 may be provided by means other than the throughput of fluid though the rotor. For example an electric motor may be used or mechanical gears driven by the flow of fluid. In this case the nozzles 29 of the rotor do not need to be angled.

Figure 3B:
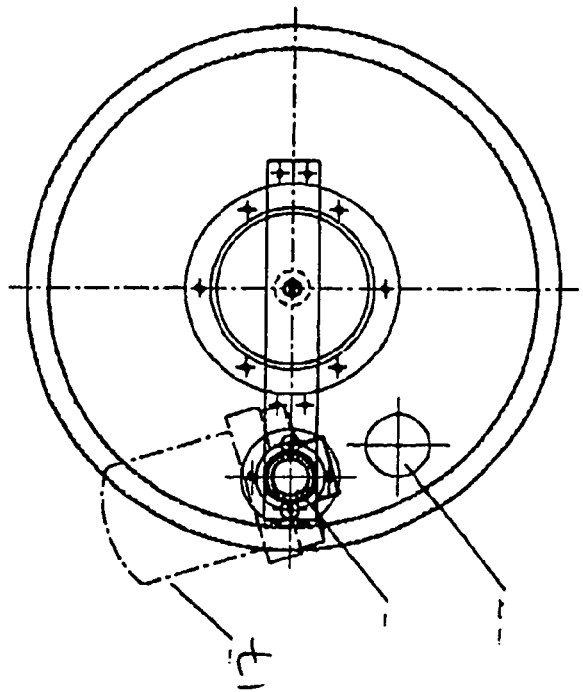

In a further variation, the filter unit 1 may be constructed as shown in FIGS. 3a and 3b wherein the top cover 11 is removeable simply by undoing a finger nut 11a threaded on spindle 21. Once the top cover 11 is removed the mesh 13 may be lifted out in one piece for cleaning and/or replacement and the rotor 14 may be accessed.

Whilst the present invention has been described in detail for use with aquaria it is to be understood that it applies equally to other bodies of water which require filtering such as fisheries, hatcheries, swimming pools, baths and ponds in general. In the specific case of hatcheries which are fed by water drawn from a river source, the filter unit assembly or filtration system may be located at the hatchery or may be located upstream of the hatchery between the source river and the hatchery.

Also, the invention may be utilised with other liquids such as blood, plasma, wine, etc. The filter may also be used to filter water for irrigation, fisheries, hatcheries, swimming pools, baths and ponds in general.

The invention claimed is:

1. A filter unit for filtering particulates and other foreign matter from a water supply, comprising a filtering chamber, at least a portion of an exterior of the filtering chamber being provided with a mesh through which water may enter the filtering chamber in use, the mesh being sized to filter particulates and other foreign matter from the water, the filter unit further comprising an outlet through which filtered water exits the filter unit, and a rotatable member located within the filtering chamber, the rotatable member having at least one outlet spaced from an internal face of a mesh, the axis of rotation of the rotatable member being such that the at least one outlet traverses at least a substantial portion of the internal face of a mesh, the filter unit further comprising a dedicated pump having an inlet communicating with the filtering chamber and an outlet communicating solely with the rotatable member such that operation of the pump causes filtered water from within the filtering chamber to be pumped through the rotatable member to exit the at least one outlet and impinge on the internal face of the mesh so as to cause particulates and other foreign matter located on an external face of the mesh to be dislodged, and;

a tank housing in which the filter unit is located, the tank housing being provided with an inlet for entry of water into the tank unit and the outlet of the filter unit forming the outlet of the tank housing;

further comprising a switch enabling periodic operation of the dedicated pump.

2. A filter unit as claimed in claim 1, wherein the pump is located remote from the filtering chamber.

3. A filter unit as claimed in claim 1, wherein the pump is attached to the filtering chamber.

4. A filter unit as claimed in claim 1, wherein the pump has a rating of greater than 2,000 liters per an hour, preferably, greater than 4,000 liters per hour.

5. A filter unit as claimed in claim 1, wherein the rotatable member has two outlets located at opposite ends of the rotatable member.

6. A filter unit as claimed in claim 5, wherein at least one of the outlets of the rotatable member is angled at between 0° and 90° of a radial direction passing through the axis rotation of the rotatable member.

7. A filter unit as claimed in claim 6, wherein at least one of the outlets of the rotatable member is angled at between 30° and 50° of a radial direction passing through the axis rotation of the rotatable member.

8. A filter unit as claimed in claim 1, wherein at least one outlet of the rotatable member is angled at substantially 90° to a radial direction passing through the axis rotation of the rotatable member.

9. A filter unit as claimed in claim 7, wherein at least one of the outlets of the rotatable member is angled at substantially 45° to the radial direction.

10. A filter unit as claimed in claim 1 wherein means are provided to rotate the rotor.

11. A filter unit as claimed in claim 10 wherein the means are an electric motor.

12. A filter unit as claimed in claim 10 wherein the means are mechanical gears driven by a flow of fluid.

13. A filter unit as claimed in claim 1, wherein the mesh has an aperture size of less than 250 microns.

14. A filter unit as claimed in claim 13, wherein the mesh has an aperture size of approximately 100 microns or less.

15. A filter unit as claimed in claim 1, wherein the mesh is one of a hollander weave mesh, a wedge wire screen or a plain weave.

16. A filter unit as claimed in claim 1, wherein the mesh is made of stainless steel grade 316.

17. A filter unit as claimed in claim 1, wherein the mesh is made of nylon.

18. A filter unit as claimed in claim 1, wherein the outlet of the pump communicates with a basal portion of the rotatable member via an inlet conduit.

19. A filter unit as claimed in claim 1, wherein the outlet of the filter unit comprises a flexible sleeve for attaching the outlet to a pipe or other conduit.

20. A filter unit as claimed in claim 19, wherein the sleeve is made of rubber or similar material.

21. A filter unit assembly as claimed in claim 1 wherein water is pumped through the tank housing by a secondary pump separate from the dedicated pump.

22. A filter unit assembly as claimed in claim 1, wherein the inlet is orientated so as to create a vortex of water within the tank housing to aid separation of particulates and other foreign matter.

23. A filter unit assembly as claimed in claim 22 wherein water is fed by gravity through the tank housing.

24. A filter unit assembly as claimed in claim 1, wherein the tank housing inlet is located at or near a top of the tank housing.

25. A filter unit assembly as claimed in claim 24, wherein the tank housing inlet is provided with an elbow so as to deflect water entering the tank housing into a direction other than the radial.

26. A filter unit assembly as claimed in claim 1 wherein the tank housing comprises a sump in which particulates dislodged from said filter unit accumulate.

27. A filter unit assembly as claimed in claim 26 wherein the tank housing has a removeable tray to which the filter unit is mounted and in which the tray serves to partition the tank housing to define a water inlet section above a base of the tray and the sump underneath the tray.

28. A filter unit assembly as claimed in claim 27 wherein sides of the tray extend above the water level in the tank housing.

29. A filter unit assembly as claimed in claim 1 wherein the switching means is a timer switch.

30. A filter unit assembly as claimed in claim 1 wherein the switching means is a float switch activatable by the water level in the tank housing.

31. A filter unit assembly as claimed in claim 1 wherein the switch is a float switch activatable by the water level in a container downstream of the tank housing.

32. A filter unit assembly as claimed in claim 1 wherein means are provided to inhibit entry of water into the tank unit when the dedicated pump is switched on.

33. A filter unit assembly as claimed in claim 32 wherein a circulatory pump of the filtration system is switched off when the dedicated pump is switched on.

34. A filter unit assembly as claimed in claim 1 which is pressurisable.

35. A filter unit assembly as claimed in claim 34 wherein the tank housing is a pressure vessel.

36. A filtration system comprising one or more filter units assemblies as claimed in claim 1.

37. A filtration system as claimed in claim 36, comprising a plurality of filter unit assemblies as claimed in claim 1, wherein the filter unit assemblies are arranged sequentially, wherein the tank housing outlet of each filter unit assembly is connected to the tank housing inlet of the subsequent filter unit assembly or outlet of the filtration system in the case of the last filter unit assembly.

38. A filtration system as claimed in claim 37 wherein the sequential filter unit assemblies are stacked vertically.

39. A filtration system as claimed in claim 38, wherein a gasket or O-ring seal is provided between adjacent filter unit assemblies.

40. A filtration system as claimed in claim 37, wherein the mesh aperture size of the filter unit in each successive filter unit assembly decreases in size.

41. A filtration system as claimed in claim 40, wherein the mesh aperture size of the first filter unit assembly is 100 microns or greater.

42. A filtration system as claimed in claim 37, wherein the mesh aperture size of the last filter unit assembly is 25 microns or less.

43. A filtration system comprising one or more filter units as claimed in claim 1 further comprising one or more biological filtering/cleaning stages.

44. A filter unit for filtering particulates and other foreign matter from a water supply, comprising a filtering chamber, at least a portion of an exterior of the filtering chamber being provided with a mesh through which water may enter the filtering chamber in use, the mesh being sized to filter particulates and other foreign matter from the water, the filter unit further comprising an outlet through which filtered water exits the filter unit, and a rotatable member located within the filtering chamber, the rotatable member having at least one outlet spaced from an internal face of a mesh, the axis of rotation of the rotatable member being such that the at least one outlet traverses at least a substantial portion of the internal face of a mesh, the filter unit further comprising a dedicated pump having an inlet communicating with the filtering chamber and an outlet communicating solely with the rotatable member such that operation of the pump causes filtered water from within the filtering chamber to be pumped through the rotatable member to exit the at least one outlet and impinge on the internal face of the mesh so as to cause particulates and other foreign matter located on an external face of the mesh to be dislodged and;
  a tank housing in which the filter unit is located, the tank housing being provided with an inlet for entry of water into the tank unit and the outlet of the filter unit forming the outlet of the tank housing;
  wherein the filter unit is located in an orifice.

45. A filter unit assembly as claimed in claim 44 wherein the radius of the orifice is defined by:

$$R_0 = \sqrt{((nr^2 + 3\eta)/n)}$$

where
$R_0$=radius of orifice
r=radius of filter in centimeters and
$\eta$=flow rate through filter in liters.

46. A filter unit assembly as claimed in claim 44 wherein the orifice is provided in a partition forming a portion of the tank housing.

47. A method of filtering water to remove particulates and other foreign matter comprising the steps of passing the water through a filtering chamber having a mesh sized to filter the particulates and other foreign matter from the water, outputting the water from the filtering chamber through an outlet of the filtering chamber, wherein a dedicated pump is used to pump water from the filtering chamber exclusively through a rotatable member located within the filtering chamber to exit through at least one outlet of the rotatable member to impinge on an interior face of the mesh so as to dislodge particulates and other foreign matter located on an exterior face of the mesh;
  wherein water output through the outlet of the filtering chamber is passed into a biological filtration system.

48. A method as claimed in claim 47 wherein the water originates from an aquarium, pond, or other vessel holding aquatic life.

49. A method as claimed in claim 47 wherein the dedicated pump is operated periodically.

50. A method as claimed in claim 49 wherein the dedicated pump is switched on and off by virtue of the water level in the tank housing.

51. A method as claimed in claim 49 wherein the dedicated pump is switched on and off by virtue of the water level in a container downstream of the tank housing.

52. A filtration system for filtering particulates and other foreign matter from a water supply, comprising a tank with an inlet and an outlet, a filtration unit through which water must pass to reach the outlet, and a sump in which particulates and other foreign matter from the water accumulates, the sump having an outlet, a drainage conduit communicating with the outlet, a pump for withdrawing water and accumulated particulates and other foreign matter through the outlet and discharging it to a drainage conduit, and a programmable controller for operating a valve and pump;
  wherein the filtration unit comprises a filtering chamber, at least a portion of an exterior of the filtering chamber being provided with a mesh through which water may enter the filtering chamber in use, the mesh being sized to filter particulates and other foreign matter from the water, the filter unit further comprising an outlet through which filtered water exits the filter unit, and a rotatable member located within the filtering chamber, the rotatable member having at least one outlet spaced from an internal face of a mesh, the axis of rotation of the rotatable member being such that the at least one outlet traverses at least a substantial portion of the internal face of a mesh, the filter unit further comprising a dedicated pump having an inlet communicating with the filtering chamber and an outlet communicating solely with the rotatable member such that operation of the pump causes filtered water from within the filtering chamber to be pumped through the rotatable member to exit the at least one outlet and impinge on the internal face of the mesh so as to cause particulates and other foreign matter located on an external face of the mesh to be dislodged.

53. A filtration system as claimed in claim 52, wherein the outlet from the sump is provided with a valve.

54. A filtration system as claimed in claim 53, wherein the valve is a gate valve.

55. A filtration system as claimed in claim 53, wherein the valve is a ball valve.

56. A filtration system as claimed in claim 52, wherein the controller includes a timer of the type used in central heating systems.

57. A filtration system as claimed in claim 52, wherein the drainage channel has an outlet or vent to atmosphere at a higher level than the inlet of the tank.

* * * * *

UNITED STATES PATENT AND TRADEMARK OFFICE
CERTIFICATE OF CORRECTION

PATENT NO. : 7,294,257 B2  Page 1 of 1
APPLICATION NO. : 10/466533
DATED : November 13, 2007
INVENTOR(S) : Nicholas Jackson It is certified that error appears in the above-identified patent and that said Letters Patent is hereby corrected as shown below:

Title Page; Please Remove:

Item (73) Assignee: Filmlight Limited (GB) from the front page of the Ribbon Copy Signed and Sealed this Fourth Day of May, 2010

David J. Kappos
*Director of the United States Patent and Trademark Office*